(12) United States Patent
Coppola et al.

(10) Patent No.: US 10,539,346 B2
(45) Date of Patent: Jan. 21, 2020

(54) AUTONOMIC COOLING SYSTEM

(71) Applicant: The Board of Trustees of the University of Illinois, Urbana, IL (US)

(72) Inventors: Anthony Coppola, Urbana, IL (US); Scott R. White, Champaign, IL (US); Nancy R. Sottos, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 191 days.

(21) Appl. No.: 15/274,591

(22) Filed: Sep. 23, 2016

(65) Prior Publication Data

US 2017/0089618 A1   Mar. 30, 2017

Related U.S. Application Data

(60) Provisional application No. 62/233,077, filed on Sep. 25, 2015.

(51) Int. Cl.
*F25B 19/00* (2006.01)
*F25D 7/00* (2006.01)
(Continued)

(52) U.S. Cl.
CPC ............... *F25B 19/00* (2013.01); *B32B 5/024* (2013.01); *B32B 5/26* (2013.01); *B32B 7/12* (2013.01); *B32B 9/005* (2013.01); *B32B 9/041* (2013.01); *B32B 9/045* (2013.01); *B32B 9/047* (2013.01); *B32B 15/00* (2013.01); *B32B 15/01* (2013.01); *B32B 15/08* (2013.01); *B32B 15/14* (2013.01); *B32B 15/18* (2013.01); *B32B 15/20* (2013.01); *B32B 18/00* (2013.01); *B32B 27/06* (2013.01); *B32B 27/08* (2013.01); *B32B 27/12* (2013.01); *F25D 7/00* (2013.01); *B22F 7/004* (2013.01); *B32B 2250/02* (2013.01);
(Continued)

(58) Field of Classification Search
CPC .................................. F25B 19/00; F25D 7/00
See application file for complete search history.

(56) References Cited

U.S. PATENT DOCUMENTS 3,613,778 A   10/1971 Feldman
3,698,834 A   10/1972 Meginnis
(Continued)

OTHER PUBLICATIONS

"Biology4ISC", ISC12 Structure and Function of Plants Plat Water Relations, Section 3 Transpiration Pull Theory, Accessed Jul. 24, 2019. https://biology4isc.weebly.com/a-plant-transport.html. (Year: 2019).*

(Continued)

*Primary Examiner* — Cassey D Bauer
(74) *Attorney, Agent, or Firm* — Haukaas Fortius PLLC; Michael H. Haukaas

(57) ABSTRACT

Autonomic cooling of a substrate is achieved using a porous thermal protective layer to provide evaporative cooling combined with capillary pumping. The porous thermal protective layer is manufactured onto the substrate. A vascular network is integrated between the substrate and the protective layer. Applied heat causes fluid contained in the protective layer to evaporate, removing heat. The fluid lost to evaporation is replaced by capillary pressure, pulling fluid from a fluid-containing reservoir through the vascular network. Cooling occurs as liquid evaporates from the protective layer.

20 Claims, 15 Drawing Sheets

1

2

3

(51) Int. Cl.
- B32B 18/00 (2006.01)
- B32B 27/08 (2006.01)
- B32B 15/00 (2006.01)
- B32B 7/12 (2006.01)
- B32B 9/00 (2006.01)
- B32B 9/04 (2006.01)
- B32B 5/26 (2006.01)
- B32B 27/12 (2006.01)
- B32B 15/01 (2006.01)
- B32B 15/18 (2006.01)
- B32B 15/14 (2006.01)
- B32B 5/02 (2006.01)
- B32B 15/08 (2006.01)
- B32B 15/20 (2006.01)
- B32B 27/06 (2006.01)
- B22F 7/00 (2006.01)

(52) U.S. Cl.
CPC ... *B32B 2260/023* (2013.01); *B32B 2260/046* (2013.01); *B32B 2262/101* (2013.01); *B32B 2262/106* (2013.01); *B32B 2307/306* (2013.01); *B32B 2307/50* (2013.01); *B32B 2307/732* (2013.01)

(56) References Cited

U.S. PATENT DOCUMENTS

| | | | |
|---|---|---|---|
| 4,765,396 A | 8/1988 | Seidenberg | |
| 6,478,997 B2 | 11/2002 | McCullough | |
| 8,771,330 B1* | 7/2014 | Roper | A61F 7/00 165/46 |
| 2002/0090873 A1* | 7/2002 | Moody | B32B 5/26 442/268 |
| 2013/0146250 A1* | 6/2013 | Eller | F28F 21/08 165/47 |

OTHER PUBLICATIONS

Coppola, Anthony M. et al., "Retention of Mechanical Performance of Polymer Matrix Composites above the Glass Transition Temperature by Vascular Cooling," Composites: Part A, 78 (2015) pp. 412-423.

DiPaola, J.M. et al., "Physiological Effects of Temperature Stress," Turfgrass—Agronomy Monograph, No. 32, 1992, pp. 231-267.

Florides, G.A. et al. "Review of Solar and Low Energy Cooling Technologies for Buildings," Renewable and Sustainable Energy Reviews, vol. 6, 2002, pp. 557-572.

Gates, David M., "Transpiration and Leaf Temperature," Annu. Rev. Plant. Physiol., 1968, (19), pp. 211-238.

Gergely, Ryan C.R. et al., "Multidimensional Vascularized Polymers Using Degradable Sacrificial Templates," Advanced Functional Materials, 2014, pp. 1-10.

Hengeveld, Derek W. et al., "Review of Modern Spacecraft Thermal Control Technologies," HVAC&R Research, vol. 16, No. 2, Mar. 2010, pp. 189-220.

Kozola, Brian D. et al., "Characterization of Active Cooling and FlowDistribution in Microvascular Polymers," Journal of Intelligent Material Systems and Structures, 2010, vol. 21, pp. 1147-1156.

Phillips, David M. et al., "Mechanical and Thermal Analysis of Microvascular Networks in Structural Composite Panels," Composites: Part A, 42 (2011), pp. 1609-1619.

Soghrati, Soheil et al., "Computational Analysis of Actively-Cooled 3D Woven Microvascular Composites Using a Stabilized Interface-Enriched Generalized Finite Element Method," Int'l Journal of Heat and Mass Transfer, vol. 65 (2013), pp. 153-164.

Soghrati, Soheil et al., "Computational Modeling and Design of Actively-Cooled Microvascular Materials," Int'l Journal of Heat and Mass Transfer, 2012, pp. 1-13.

Stroock, Abraham D. et al., "The Phy7sicochemical Hydrodynamics of Vascular Plants," Annu. Rev. Fluid Mech., vol. 46, 2014, pp. 615-642.

Wang, J.H. et al., "An Experimental Investigation on Transpiration Cooling Part II: Comparison of Cooling Methods and Media," International Journal of Rotating Machinery, 10(5), 2004, pp. 355-363.

Yeh, L.T., "Review of Heat Transfer Technologies in Electronic Equipment," Journal of Electronic Packaging, Dec. 1995, vol. 117, pp. 333-339.

* cited by examiner

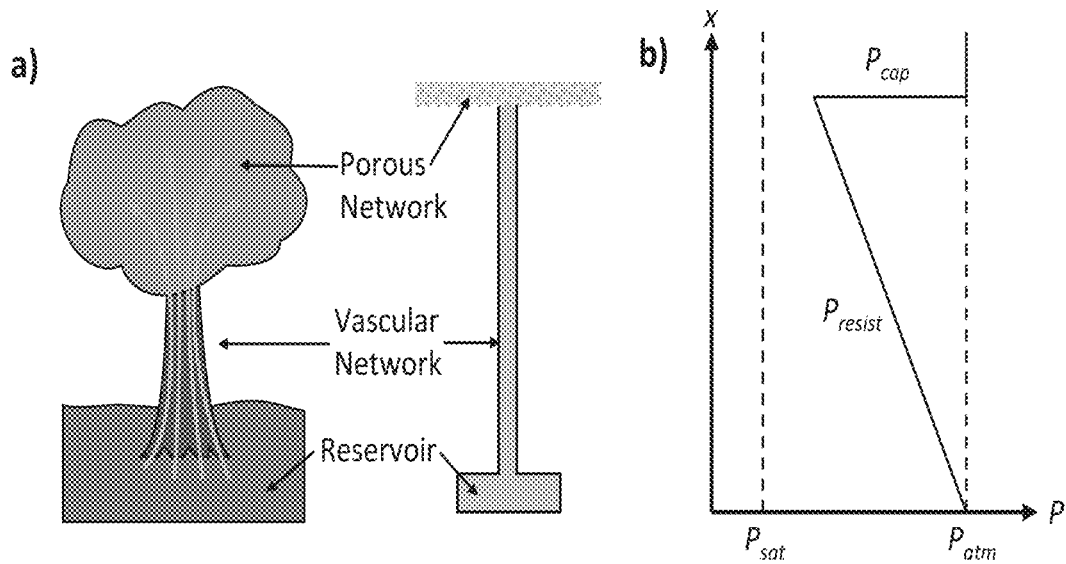
*Figure 1A-B*
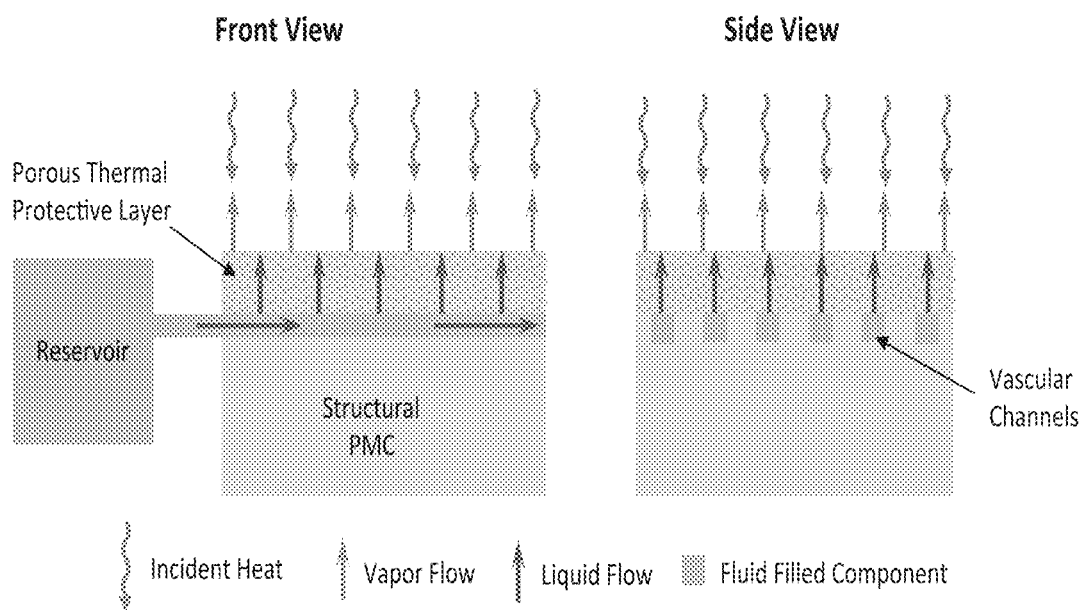
*Figure 2*

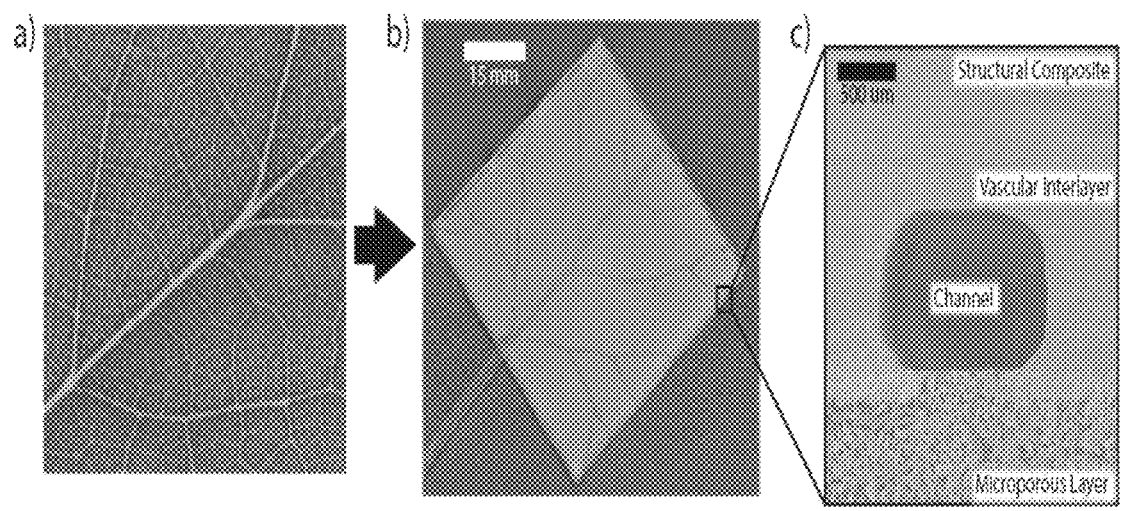
*Figure 3A-C*
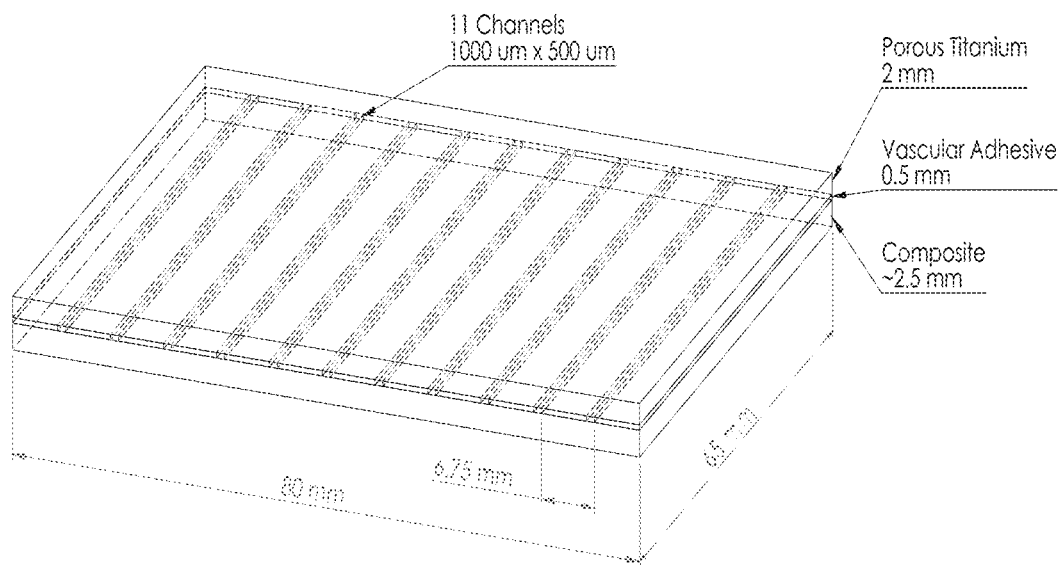
*Figure 4*

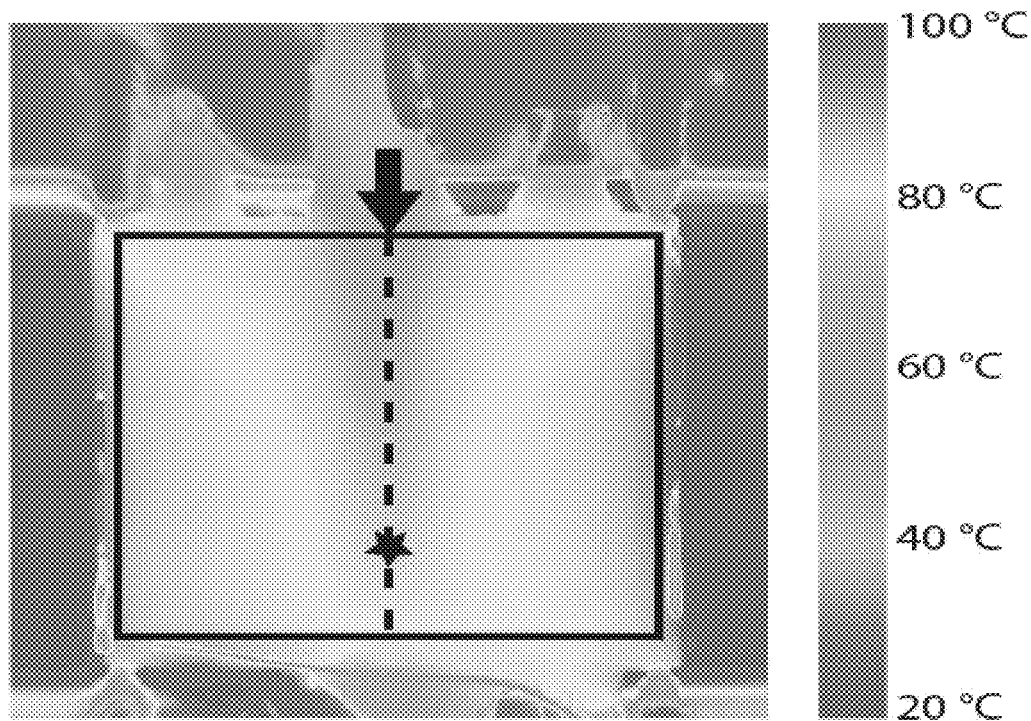
*Figure 15*
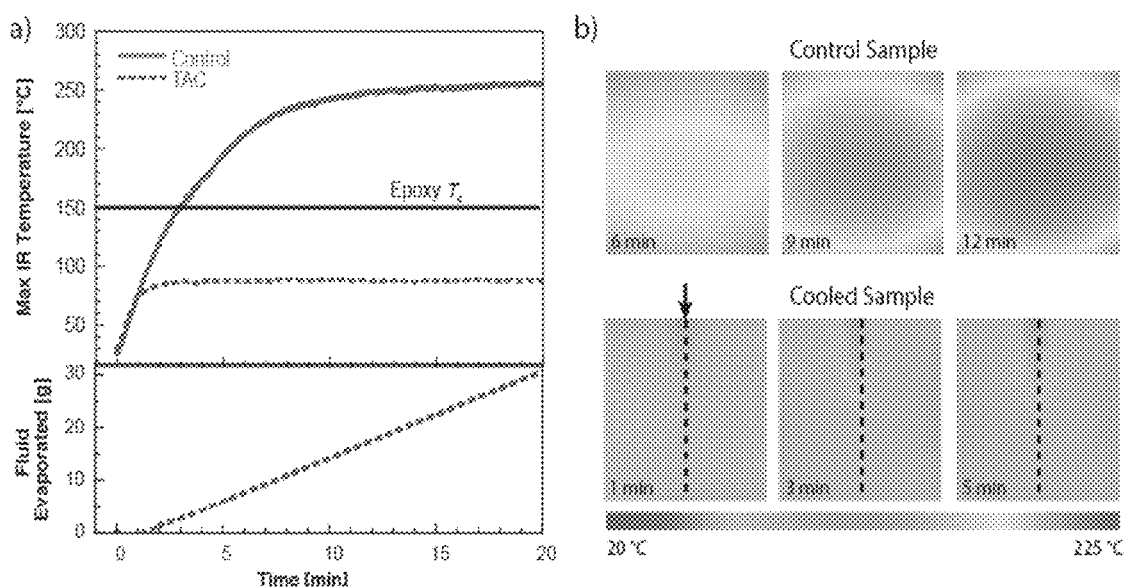
*Figure 16A-B*

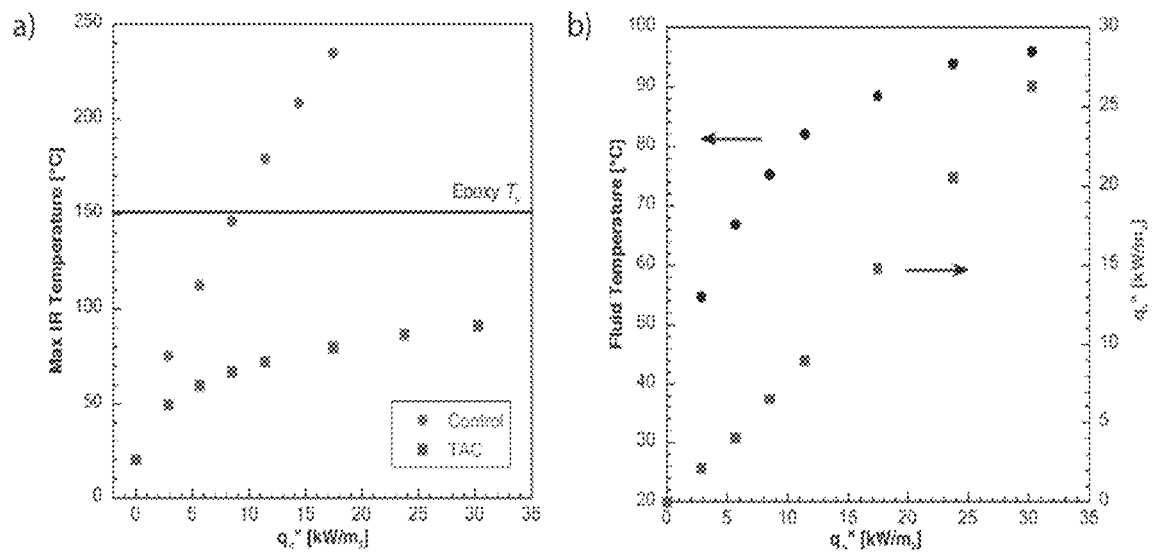
Figure 17A-B
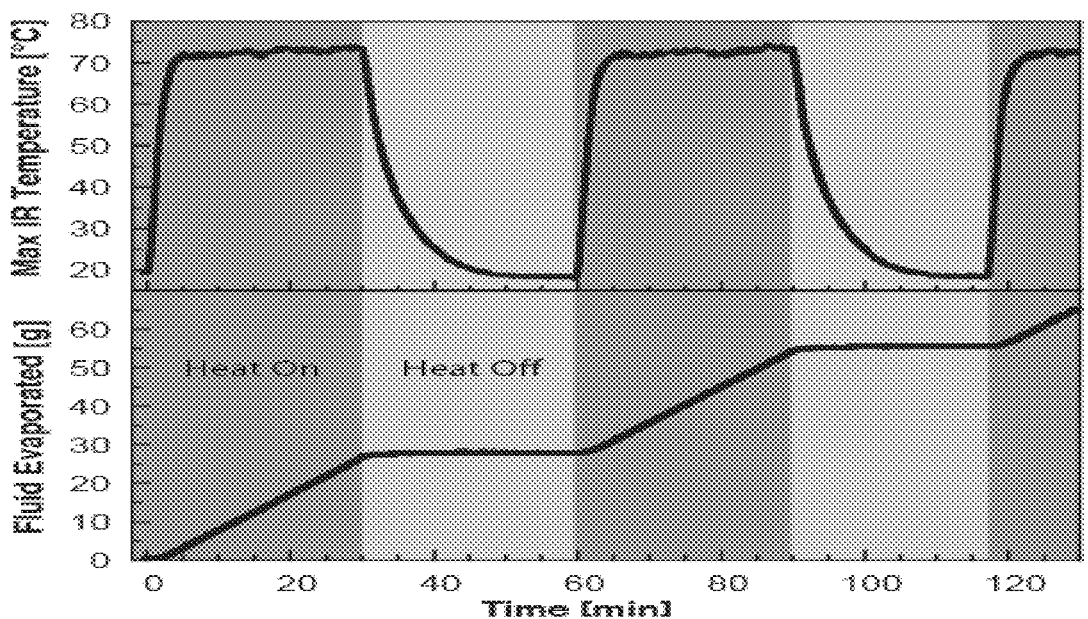
Figure 18

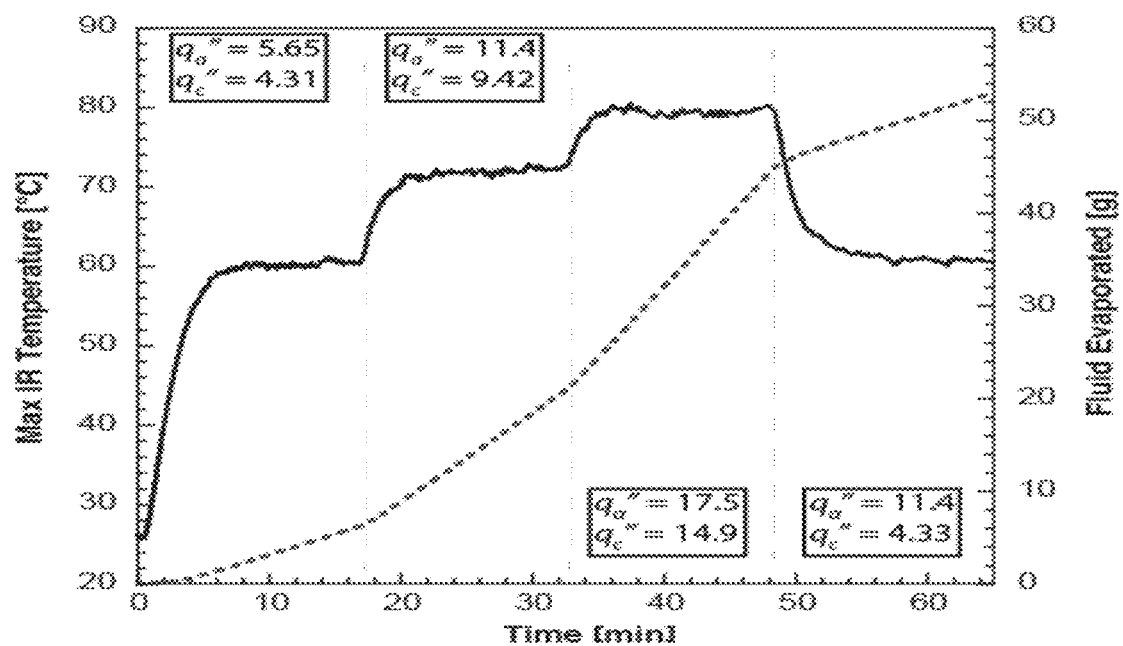
Figure 19
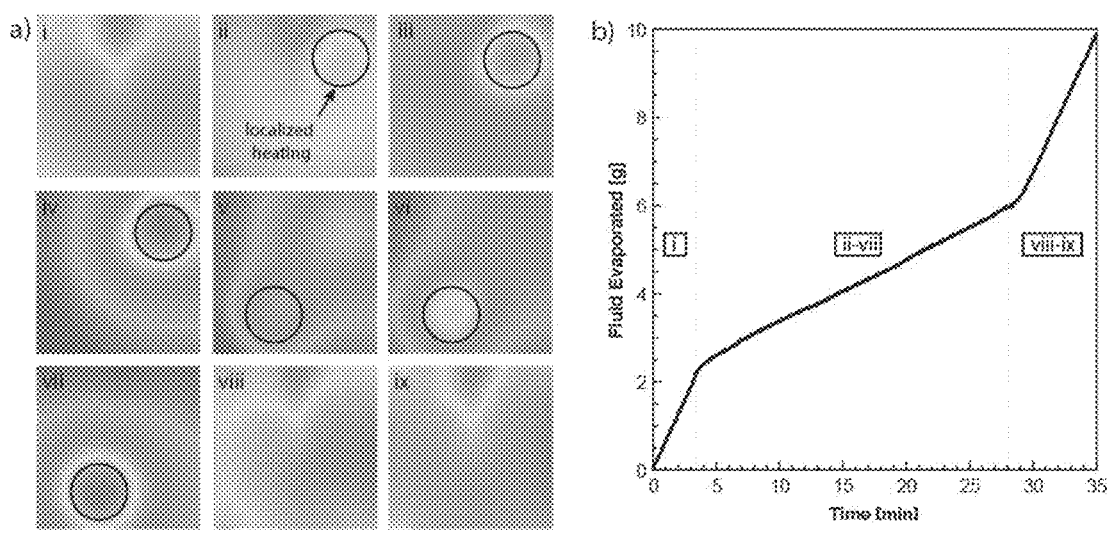
Figure 20A-B

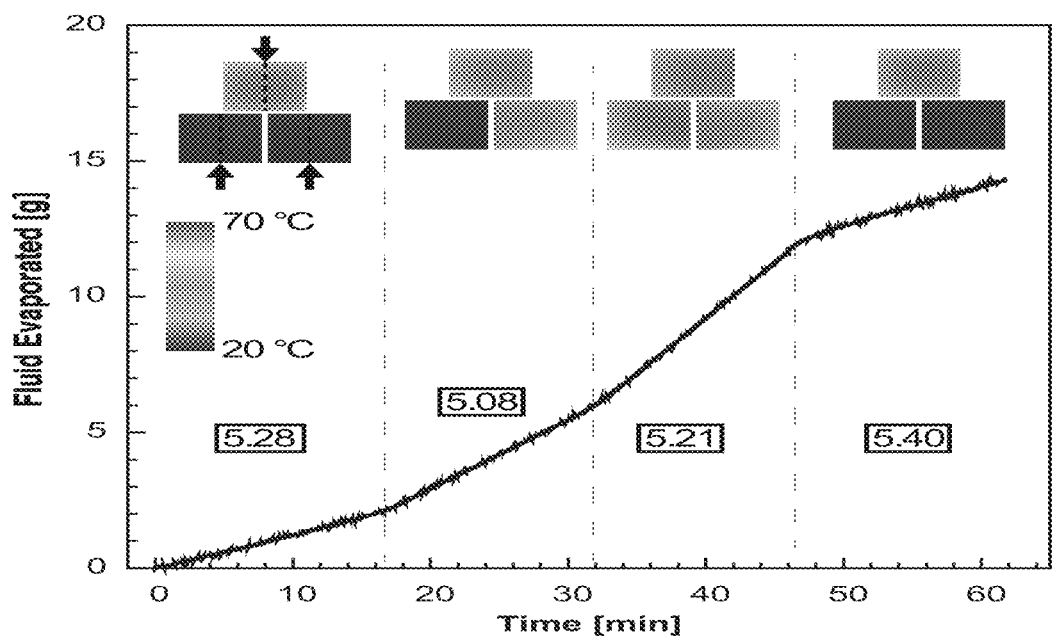
*Figure 21*
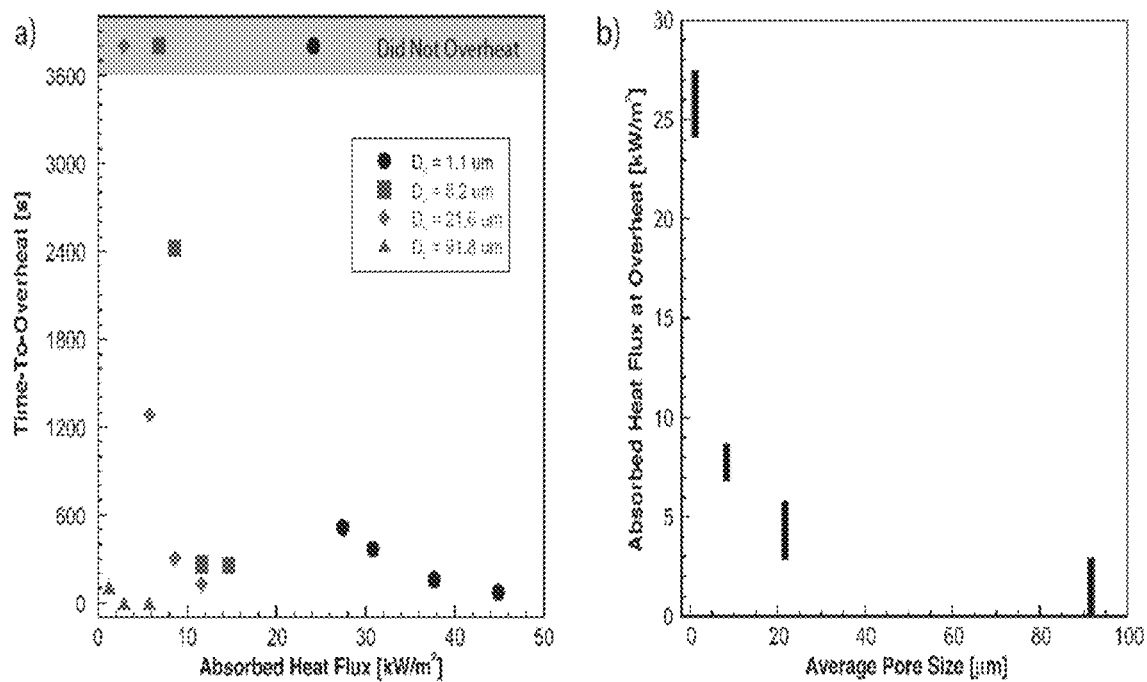
*Figure 22A-B*

AUTONOMIC COOLING SYSTEM

RELATED APPLICATIONS

This application claims priority under 35 U.S.C. § 119(e) to U.S. Provisional Patent Application No. 62/233,077, filed Sep. 25, 2015, which is incorporated herein by reference.

GOVERNMENT SUPPORT

This invention was made with government support under Grant No. FA9550-09-1-0686 awarded by the Air Force Office of Scientific Research and Grant No. DGE 11-44245 awarded by the National Science Foundation. The United States Government has certain rights in the invention.

BACKGROUND OF THE INVENTION

Reducing energy usage in engineered systems is a primary concern because of the high cost and environmental impact of generating, transmitting and storing power. Lightweight components require significantly less energy to set them in motion. A component made from a polymer matrix composite (PMC) often weighs significantly less than the same component made from a metal or ceramic. While this benefit is commonly exploited in near ambient applications, high heat or cold applications, such as high-speed flight, vehicle components and structural support for batteries, fuel cells and other electronics are primarily handled by metals or high cost ceramic and metal matrix composites.

High performance fiber-reinforced PMCs have found widespread applicability in the automotive, aerospace and marine industries due to their low weight, excellent structural performance and manufacturability. PMCs provide outstanding benefits to structural systems at room temperature because of their high strength, high stiffness and low density. However, at high temperatures (ca. 100-300° C.), the structural capability of a PMC is greatly reduced, leading to the potential for material failure. This limitation is because the stiffness of polymeric materials, such as epoxy, polyethylene, and other plastics, is greatly reduced as the temperature of the material is raised. In addition, many plastics used as matrix materials are flammable, leading to additional dangers to using composites in places where fire is a possibility. While high temperature, non-flammable plastics exist, they almost universally suffer from high costs or difficult processing.

The service temperatures for a fiber-reinforced polymer matrix composites are severely limited by relatively low glass transition temperatures possessed by typical matrix materials, such as epoxy (ca. <200° C.), vinyl ester (ca. <150° C.) and bimaleimides and polyimides (ca. <250° C.). Above the glass transition temperature, the structural performance of a PMC is greatly reduced as a result of matrix softening. In addition, damage may form in PMCs after only a short exposure to high temperature, including delamination, matrix cracking, fiber-matrix debonding, combustion and fire. Accordingly, application of PMCs in high heat conditions requires a method for thermal regulation.

Active cooling through microfluidic channels has been utilized in electronics, fuel cells, high power batteries, micro-electro-mechanical systems (MEMS) and spacecraft systems. Several studies have examined the use of active cooling, where an external pump circulates liquid through internal micro-channels within a composite to remove heat. Results indicate that networks featuring branching and complex channel pathways are best situated to maximize the effectiveness of a cooling system. See e.g., Soghrati, S., P. R. Thakre, S. R. White, N. R. Sottos, and P. H. Geubelle (2012) "Computational modeling and design of actively-cooled microvascular materials," *Int. J. Heat Mass Transf,* 55(19-20):5309-21; Soghrati, S., A. R. Najafi, J. H. Lin, K. M. Hughes, S. R. White, N. R. Sottos, and P. H. Geubelle (2013) "Computational analysis of actively-cooled 3D woven microvascular composites using a stabilized interface-enriched generalized finite element method," *Int. J. Heat Mass Transf.* 65:153-64; Kozola, B. D., L. A. Shipton, V. K. Natrajan, K. T. Christensen, and S. R. White (2010) "Characterization of Active Cooling and Flow Distribution in Microvascular Polymers," *J. Intell. Mater. Syst. Struct.* 21(12):1147-56; and Phillips, D. M., M. R. Pierce, and J. W. Baur (2011) "Mechanical and thermal analysis of microvascular networks in structural composite panels," *Compos. Part A: Appl. Sci. Manuf.* 42(11):1609-19.

These studies have demonstrated active cooling as an effective method for enabling PMC service where high thermal loads are present. However, active cooling requires an externally powered pumping system and a method for removing heat from the fluid before it is re-circulated. The high power requirement for pumping liquid through the micro-channels can negate the energy savings gained from switching to a lightweight PMC. In addition, no methods currently exist for autonomic adaptive control (e.g. to automatically control flow rate in each channel) of the cooling, which means that conventional cooling systems can waste energy by pumping coolant to areas that are not being heated and/or pumping coolant when there is no need for it (e.g., when a low thermal load is present). Accordingly, none of the conventional systems are suitable for cooling large areas of a PMC without the need for external powering and/or controls.

Accordingly, there is a need for a system that can autonomously cool a structural material, allowing it to be used in places where it is subjected to both high heat and high structural loads. Such a system could replace heavy metal and/or ceramic materials and reduce system weight.

In this patent, we describe a novel cooling system and cooling method for materials, such as structural composites. The system is autonomic, self-powered and adaptable to changing thermal conditions without external sensing, control or powering.

SUMMARY

One embodiment of the invention provides an autonomic cooling system comprising a fluid-containing reservoir connected to a material containing the fluid. The material comprises (a) a porous thermal protective layer, (b) a substrate; and (c) a vascularized layer integrated between the porous thermal protective layer and the substrate. The system autonomically cools the material upon an application of sufficient heat from a heat source to the material, whereby the vascularized layer disperses the fluid throughout enough of the porous thermal protective layer to produce a pressure gradient between the reservoir and the pores of the porous thermal protective layer, the fluid in the porous thermal protective layer evaporates to remove the applied heat, and the fluid lost by the evaporation is replaced via capillary pressure drawing fluid from the reservoir to the vascularized layer.

The capillary pumping replenishes evaporated fluid in a porous thermal protective layer manufactured onto a substrate. The applied heat is transformed to mechanical energy for delivering cooling fluid in the form of capillary pumping making the system inherently self-powered and adaptive. Evaporation absorbs a large amount of heat and caps the temperature within the substrate near the saturation temperature (e.g., boiling point) of the fluid. The system is autonomically adaptable to changing thermal conditions and adjusts the flow rate depending on the incident heat flux.

In various embodiments, the fluid comprises water, an alcohol, a glycol, an aldehyde, an amine, an amide, or a combination thereof.

In various embodiments, the substrate comprises a metal, non-metal, ceramic, polymer or a combination thereof.

In various embodiments, the porous protective layer comprises a metal, non-metal, alloy, oxide, non-oxide, or a combination thereof.

Another aspect of the invention is a method of manufacturing a material comprising:
(a) providing a porous thermal protective layer;
(b) filling the pores of the protective layer with a pore filler;
(c) cleaning at least one of the surfaces of the protective layer;
(d) bonding a sacrificial template of a vascularized layer to the cleaned surface of the porous thermal protective layer;
(e) bonding a substrate to the cleaned surface of the porous thermal protective layer;
(f) removing the pore filler from the pores of the porous thermal protective layer; and
(g) removing the sacrificial template to form the vascularized layer integrated between the substrate and the porous thermal protective layer.

Another aspect of the invention is a method of autonomically cooling a material exposed to a heat source, comprising
(a) providing the heat source;
(b) providing a fluid-containing reservoir connected to the material; and
(c) filling the material with the fluid from the reservoir; where the material comprises:
(a) a porous thermal protective layer;
(b) a substrate; and
(c) a vascularized layer integrated between the porous thermal protective layer and the substrate; and where the system autonomically cools the material upon an application of sufficient heat from the heat source to the material, whereby the vascularized layer disperses the fluid throughout enough of the porous thermal protective layer to produce a pressure gradient between the reservoir and the pores of the porous thermal protective layer, the fluid in the porous thermal protective layer evaporates to remove the applied heat, and the fluid lost by the evaporation is replaced via capillary pressure drawing fluid from the reservoir to the vascularized layer.

The cooling system and cooling method autonomically protect a material exposed to a heat source from heat degradation or failure. It can automatically start and stop over and over again, adapt to changing temperature conditions and utilize plentiful and inexpensive fluids, such as water.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIG. 1A-B shows the concept of an autonomic cooling system comparing the cooling architecture of a tree to the cooling architecture of the autonomic cooling system. (a) transpiration occurs in a tree when water is drawn (or pumped) from the soil (i.e. reservoir), through the xylem contained in the roots, trunk and branches (i.e. vascular channels), and into the leaves (i.e. porous network) by capillary action. Also shown in (a) is a schematic displaying the reservoir, vascular network and porous network of the autonomic cooling system compared to the same elements in a tree. (b) The fluid pressure as a function of position relative to the system shown in (a).

FIG. 2 shows frontal and side conceptual views of the autonomic cooling of a structural composite.

FIG. 3A-C shows venation in leaves and in the autonomic cooling system. (a) Photograph of the venation of an eastern redbud; (b) Photograph of an autonomic cooling specimen showing many branching channels within the PMC originating from the external supply channel; and (c) SEM image of cross-section of the autonomic cooling specimen.

FIG. 4 shows a schematic of an autonomic cooling system specimen.

FIG. 15 shows a typical temperature profile recorded during a cooling test with an IR camera.

FIG. 16A-B compares the transient temperature response and temperature field of an autonomic cooling system specimen under constant heat flux to a non-cooled control specimen. (a) The maximum IR temperature for control and TAC samples and fluid evaporated by the cooled specimen as a function of time; and (b) the IR temperature profiles for the same samples at various times.

FIG. 17A-B compares the maximum temperature at steady state for control and autonomic cooling system specimens as a function of heat flux and the fluid temperature and cooled heat flux as a function of supplied heat flux. (a) The maximum IR temperature at steady state as a function of supplied heat flux for control and cooled specimens; and (b) the fluid temperature 15 mm from end of channel and cooled heat flux as a function of supplied heat flux.

FIG. 18 shows the self-starting and self-stopping functionality of the autonomic cooling system.

FIG. 19 shows the adaptability of the autonomic cooling system to changing heat loads.

FIG. 20A-B shows the effect of localized heating on an autonomic cooling system specimen. (a) IR temperature profiles for the same samples at various times, and (b) fluid evaporated by the cooled specimen as a function of time.

FIG. 21 shows the operation of multiple autonomic cooling system specimens drawing from the same reservoir.

FIG. 22A-B shows the maximum operation conditions as a function of average pore diameter. (a) Time-to-overheat as a function of absorbed heat flux; and (b) bounds for maximum absorbed heat flux at overheat as a function of average pore diameter.

DETAILED DESCRIPTION

Figure 5:
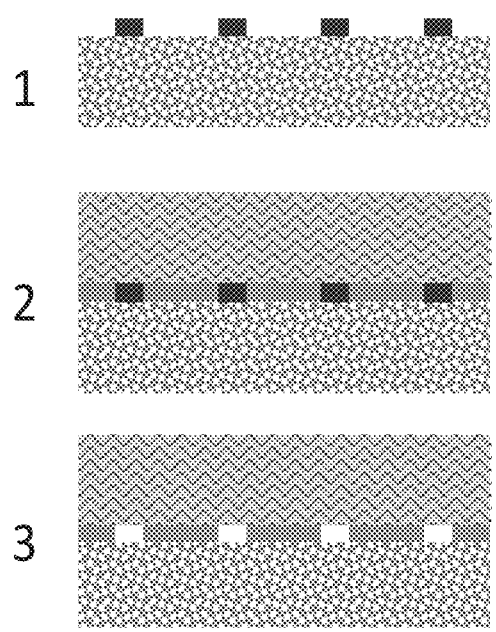
FIG. 5 shows a schematic procedure to manufacture an autonomic cooling system specimen (Specimen A).

We describe herein a new autonomous system and method for thermal regulation of structural and non-structural materials. The thermal regulation utilizes evaporative cooling and capillary pumping to eliminate the need for an external pump and heat exchanger. Evaporation is an endothermic process where the heat is carried into the surroundings by the vapor. The heat can supply all the necessary energy required for virtual continuous cooling, making the system inherently autonomically adaptable to changing thermal loads. Some of the features include self-starting, self-stopping, adaptive flow rate control and redirection of the flow to hotter regions. The system is useful for controlling the temperature of a structural material, such as a PMC. PMCs are composed of high strength/stiffness fibers, held together by a polymer matrix material. Common examples include carbon fiber composites and fiber-glass.

Inspired by the biological processes of transpiration seen in nature, such as in plant life and trees, we have developed and described herein a novel autonomic cooling system and cooling method of materials that mimic the way transpiration occurs in nature. In nature, plants use transpiration to transport water against gravity from the soil to their leaves, powering the flow of nutrients throughout the plant. During transpiration, water evaporates from the leaves (i.e. porous network) and is replenished by the xylem (i.e. vascular channels) from the water stored in the soil (i.e. reservoir). In the synthetic system described herein, autonomic cooling of a structural composite is accomplished using a leaf inspired vascularized coating manufactured onto the structural composite. In response to an external heat load, evaporation occurs from fluid dispersed in pores designed into the coating to remove heat. The fluid is then replaced by capillary action from an externally located fluid-containing reservoir, allowing for virtual continuous operation. Thus, when sufficient heat is applied (e.g., sunlight) to the system, it autonomically removes the heat until the reservoir is empty or overheat occurs. Experiments are described herein that demonstrate the cooling performance of the system, its ability to self-start and stop, the adaptability of the evaporation rate to changing heat loads, and the ability to remotely locate the reservoir.

As shown in (a) of FIG. 1, transpiration occurs in a tree when water is drawn (or pumped) from the soil (i.e. reservoir), through the xylem contained in the roots, trunk and branches (i.e. vascular channels), and into the leaves (i.e. porous network) by capillary action. Small pores contained in the leaves, called stomata, allow the water to evaporate causing a continuous flow of water to be drawn in to replace the lost fluid. Also shown in (a) in FIG. 1 is a schematic displaying the reservoir, vascular network and porous network of the autonomic cooling system compared to the same elements in a tree.

Pores as small as 22 nm in diameter in the stomata allow for transport of water against gravity at heights of many meters as the water is pulled in tension through the xylem at pressures as low as −10 MPa. The capillary pressure ($\Delta P_{cap}$) generated by the pores is determined by Equation (1):

$$\Delta P_{cap} = \frac{4\gamma \cos(\theta)}{D_P}, \quad (1)$$

where $\gamma$ is the air-water surface tension, $\theta$ is the contact angle between the pore's surface and the water and $D_p$ is the diameter of the pore. In order for flow to occur, the capillary pressure must be greater than or equal to the system's total resistance to fluid flow ($\Delta P_{resist}$), as shown by Equation (2):

$$\Delta P_{cap} \geq \Delta P_{resist}. \quad (2)$$

The resistance to fluid flow is equal to the pressure drop caused by the fluid being pulled through the vascular network ($\Delta P_l$), through the porous material ($\Delta P_p$), and against the gravitational forces ($\Delta P_g$) as shown by Equation (3):

$$\Delta P_{resist} = \Delta P_l + \Delta P_p + \Delta P_g \quad (3).$$

The fluid pressure as a function of position relative to the system shown in (a) of FIG. 1 is graphically shown in (b) of FIG. 1. To prevent cavitation, the fluid pressure must remain above its saturation pressure ($\Delta P_{sat}$).

Autonomic cooling of a structural PMC is achieved using a porous thermal protective layer to provide evaporative cooling combined with capillary pumping. FIG. 2 shows a schematic of the approach. A porous thermal protective layer is manufactured onto the structural PMC. A vascular network of channels connected to the porous layer is manufactured into the PMC. The vascular network lowers the system permeability, and therefore ($\Delta P_{resist}$), by providing an easy pathway for cooling liquid to disperse across the porous layer. This is similar to the operation of the venation in leaves. Applied heat causes fluid contained in the porous thermal protective layer to evaporate, removing heat. The lost fluid is replaced by capillary pressure developed by small pores, pulling fluid through the vascular network from a reservoir. External placement of the reservoir allows for a large volume of liquid to be stored. An external reservoir can be located below (relative to gravity) the porous thermal protective layer due to the pressure developed by the capillary action. Capillary action in the porous network provides the pumping pressure. While an external reservoir is exemplified herein, any means to supply or replenish fluid to the system will work (e.g., manually adding fluid to the system).

The evaporation rate, and therefore fluid flow rate, is dependent on the incident heat load making the approach autonomically adaptable to changing thermal conditions. The evaporation rate is related to the heat load as shown in Equation (4):

$$q = h_v \frac{dm}{dt}, \quad (4)$$

where q is the heat removed by evaporation, d is the differential operator, m is the mass of fluid lost, $h_v$ is the enthalpy of vaporization of the fluid (effectively, the amount of energy removed per unit mass), t is time, and dm/dt is the derivative of m with respect to time.

The heat flux supplied is $q_s''$. The evaporation rate is measured by tracking the rate of change of the mass of the fluid reservoir. The heat flux removal rate, $q_c''$, can be determined by Equation (5):

$$q_c'' = \frac{\frac{dm}{dt}h_v}{A} \quad (5)$$

where A is the area that is heated.

One of the advantages of the cooling system is that it is self-powered, since the only energy required for operation is that provided by the heat source. The thermal protection layer can cover a large area because the vascular network provides a path to deliver liquid across a large area without requiring long flow paths through the porous material. Even when the porous thermal protective layer covers a large area, it can cool locally and minimize fluid loss because evaporation only occurs in the area where the specimen is heated. The height change between the reservoir and the thermal protective layer that can sustain the capillary pumping is dependent on the pore size, but can be several meters in the case of very small pores. (Under certain conditions, smaller pores can provide greater capillary pumping power.) The capillary pumping resists the weight of the fluid. The microscopic structure of the autonomic cooling system allows for robust capillary pumping power. This simple mechanism obviates the need for additional pumps or pressure gradients to drive the liquid in the cooling system.

In one embodiment, water is used as a cooling and evaporating fluid because it is inexpensive, non-toxic, non-flammable and environmentally friendly. Other embodiments can use cooling fluids other than water or mixtures of water with other liquids and/or ingredients to make a cooling fluid. Depending on the application desired, a skilled artisan can design a fluid possessing properties conducive to effect cooling, evaporation and replenishment. Some examples include ammonia, alcohols (e.g., ethanol), glycols, ketones (e.g., acetone), aldehydes, amines, amides, or combinations thereof, or a mixture of water with one or more of the above fluids.

The porous thermal protective layer integrates with the substrate. The layer protects the substrate from heat and temperature gradients that could degrade or otherwise adversely affect the properties of the substrate. The porous thermal protective layer contains pores, whose sizes and shapes can be modified to optimize the uptake, release and evaporation of the cooling fluid. The contact angle between the layer and the chosen fluid should usually be less than 90° so that the fluid can sufficiently "wet out" the solid.

In certain embodiments, the porous thermal protective layer comprises a traditional and/or advanced ceramic. Traditional ceramics are generally clay-based and include inorganic solids made up of either metal or non-metal compounds that have been shaped and then hardened by heating to high temperatures. Advanced ceramics are generally not clay-based and include metals, non-metals, oxides, non-oxides and combinations thereof. Typical oxides that may be used are alumina ($Al_2O_3$), titania ($TiO_2$) and zirconia ($ZrO_2$). Representative non-oxides include carbides, borides, nitrides and silicides, for example, boron carbide ($B_4C$), silicon carbide (SiC) and molybdenum disilicide ($MoSi_2$). In some embodiments, the porous thermal protective layer comprises a polymer, metal (e.g., titanium or aluminum) and/or metal alloy (e.g., stainless steel). The porous thermal protective layer may include a combination of the above materials.

The substrate can be anything designed to carry a load, such as a structural or non-structural (e.g., elastomer) substrate. A structural substrate is one that carries the load with minimal deflection. Structural substrates include metal, non-metal, ceramic and polymeric materials, or a combination thereof. In certain embodiments, the structural substrate comprises a PMC, such as fiber-glass, carbon fiber, an epoxy resin, or a combination thereof. In one embodiment, the PMC comprises a combination of the epoxy resin with the fiber-glass or the carbon fiber. The epoxy can be vacuum infused into the fiber-glass or the carbon fiber to create a glass or carbon fiber reinforced epoxy composite. The vascular network described herein can also be applied to woven textile PMCs, either 2D or 3D.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise.

The claims may be drafted to exclude any optional element. This statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "at least one" and "one or more" are readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values (e.g., numbers recited in weight percentages and material sizes) proximate to the recited range that are equivalent in terms of the functionality of the individual ingredient, material, composition, or embodiment. The term about can also modify the end-points of a recited range as discussed above in this paragraph.

As will be understood by the skilled artisan, all numbers, including those expressing sizes of materials, quantities of ingredients, and properties, such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited herein are for illustration only and do not exclude other defined values or other values within defined ranges.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "autonomic" system refers to automatically (without human or electronic control intervention) stopping, starting and adapting operation of the system depending on environmental stimuli, for example, the temperature of the environment or the incident heat load. For example, when a cooled substrate is exposed to a certain amount of heat, the autonomic system will automatically start the cooling mechanism to keep the substrate cooled. Conversely, when the conditions causing the heating of the substrate abate, the autonomic system will automatically stop the cooling mechanism described herein. The autonomic system can start and stop over and over again.

The term porous "thermal protective" layer refers to a material that protects a substrate from environmental stimuli, such as, changes in the temperature of the environment in which the substrate is placed.

The term "vascularized layer" means a layer comprising one or more inlets, one or more straight and/or branching channels, or a combination thereof.

The phrase "vascularized layer integrated between the porous thermal protective layer and the substrate" means that the vascularized layer is placed in contact with or close proximity to the substrate (e.g., a structural substrate, such as a polymeric matrix composite) and/or the porous thermal protective layer. While the examples disclosed below effect integration by bonding the vascularized layer to the porous protective layer and the substrate, it is understood that any means of bonded or non-bonded integration (e.g., uniting, joining, combining, unifying, incorporating, etc.) should also work so long as principles of evaporative cooling can be met.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

A "sufficient" amount refers to an amount sufficient to bring about a recited effect, such as an amount of heat necessary to initiate the evaporative cooling mechanism of the autonomic cooling system. Thus, a "sufficient" amount generally means an amount that provides the desired effect.

The autonomic cooling system described herein possesses several advantages over conventional types of thermal regulation systems. A heat pipe (HP) or loop heat pipe (LHP) system is commonly used in industry. HPs and LHPs are typically used to transfer large amounts of heat generated by a very localized heat source over a large distance. These systems are commonly used for thermal regulation in structural materials. During active cooling, a fluid is actively pumped using an externally powered pump (e.g. an electrically powered pump) through channels embedded in the material to remove heat and reduce temperature. These systems are not autonomous, since the fluid flow rate is controlled by the pumping power.

Another conventional thermal regulation system is an evaporative cooler, which is used for air conditioning in areas where the climate is hot and dry. Evaporative coolers cool air by blowing the air over evaporative pads that are soaked in water by capillary action. Evaporative coolers are generally not used to regulate the temperature of structural materials. They are essentially air conditioners that use large fibrous (flexible) pads as the evaporative surface. They also don't use capillary action to pump coolant from a reservoir. Evaporative coolers use an external pump to move the cooling medium. Evaporative coolers are designed to cool the air that passes through them, not a solid material in thermal contact with it.

While the autonomic cooling system described herein share some of the similar principles and structures to conventional HP and LHP systems, there are several distinct and important differences. One substantial difference is that the autonomic cooling system is an open system that does not include vapor removal channels, a vapor line, or a condenser. It also does not require a compensation chamber. To our knowledge, all of the HP and LHP systems feature a closed loop design. In contrast, the autonomic cooling system uses an open loop design where the vapor is lost to the atmosphere. This has several advantages over conventional heat pipe systems. First, the autonomic cooling system is simpler in terms of design because no consideration needs to be given to a compensation chamber or vapor capture system design. Second, the autonomic cooling system is significantly smaller in scale because it eliminates the condenser, the vapor return portion of the loop and the compensation chamber found in LHPs. (In LHPs, the compensation chamber is often the largest component by volume.) The result of smaller volume is that the autonomic cooling system is better suited for use as a thermal protective layer for structural materials because both weight and volume are significant concerns in many structural systems. Third, while LHPs are often described as self-powered, this is not entirely true in all cases because an externally powered cooling system is generally required to remove enough heat in the condenser to actually condense the vapor into a liquid. In contrast, the autonomic cooling system can be essentially entirely self-powered, since all heat is dissipated to the atmosphere along with the vapor. While losing the vapor to the atmosphere means that the fluid needs to be regularly replenished, the cost for this process would be relatively low since the system can run on inexpensive cooling fluids, such as water. Finally, the autonomic cooling system autonomically starts and stops operation much quicker and easier than LHPs. When not in operation, the vapor side of the loop in LHPs can fill with liquid and substantial overheat is often required to remove this liquid and (re)start the circulation process. The autonomic cooling system requires no overheat and can immediately (re)start operation upon heating.

The autonomic cooling system described herein possesses several advantages over conventional active cooling systems. First, the autonomic cooling system is self-powered, whereas all active cooling systems require an externally powered pump. Second, the heat in the autonomic cooling system is dissipated to the atmosphere and does not need to be removed from the fluid, as is the case for active cooling systems. Third, the autonomic cooling system requires much less fluid than active cooling because of the high efficiency of evaporative cooling compared to convective cooling. Fourth, cooling in the invention described herein is self-starting/stopping, and autonomously adaptive to changing thermal loads, unlike active cooling systems, which need to be externally controlled. Finally, cooling in the invention described herein occurs only locally in the heated area, unlike active cooling systems where liquid flows through all of the channels whenever heat is applied.

The autonomic cooling system is useful for thermal regulation of materials, particularly, structural substrates. Suitable applications include when heat is applied intermittently, requiring a relatively small reservoir, or where a large volume of water can be stored and regularly replenished without concern for the size and/or mass of the reservoir. The features of the autonomic cooling system are well served for applications that feature intermittent and varying heat.

The autonomic cooling system was inspired by transpiration in plant life and trees, where fluid is transported from the soil to leaves many meters against gravity by capillary action as a result of fluid loss through evaporation in the leaves. The autonomic cooling system is capable of self-starting upon the application of sufficient heat and adapting to changing thermal conditions. The design and operation of an autonomic cooling system for PMCs was demonstrated in the following Examples, which are intended to illustrate the above invention and should not be construed as to narrow its scope. One skilled in the art will readily recognize that the Examples suggest many other ways in which the invention could be practiced. It should be understood that numerous variations and modifications can be made while remaining within the scope of the invention.

EXAMPLES

Aspects of an Autonomic Cooling System

Example 1—Venation

FIG. 3 shows venation in a leaf and in the synthetic autonomic cooling system.

(a) Photograph of the venation of an eastern redbud (*Cercis canadensis*) showing the branching and hierarchical structure. Many small veins branch off of the central major vein.

(b) Photograph of an autonomic cooling specimen showing many branching channels within the PMC originating from the external supply channel. In the image, the fiberglass layer is facing the camera.

(c) SEM image (5 KeV, 100× magnification, secondary electron detector) of cross-section of the autonomic cooling specimen.

This approach is again inspired by trees. It has been reported that leaves contain highly dense, hierarchical venation to increase the hydraulic conductance of the leaf (i.e. flow rate across the leaf divided by the driving force), making is easier to disperse water throughout the leaf. This effect is shown in (a) of FIG. 3. The effect is achieved by maximizing the distance the water travels through the xylem and minimizing the distance it flows through the less permeable leaf tissue. Under some conditions, it is believed that branching vascular channels positioned in the synthetic autonomic cooling system can similarly increase the hydraulic conductance, thus decreasing flow resistance. This is shown in (b) of FIG. 3. Likewise, (c) of FIG. 3 illustrates the two orders of magnitude size difference between the vascular channels and the pores. One embodiment of the autonomic cooling system would feature a large external delivery channel, small pores, and a dense vascular network within the structural substrate.

Example 2—Specimen Design

The design of an autonomic cooling specimen is shown in FIG. 4. The specimen is composed of a porous titanium layer (ca. 20 um pores, 50% porosity, obtained from Accumet Materials Co.) that acts as the porous thermal protective layer, and a glass fiber/epoxy composite that acts as the structural substrate. The PMC was manufactured from 12 layers of 7781-style woven E-glass fabric (Fiber Glast Developments Corp.) infused with Huntsman 8605 epoxy resin (Freeman Mfg. and Supply Co.) using vacuum assisted resin transfer molding and cured at 121° C. for 2 h and 177° C. for 3 h. In between these two layers is a vascularized adhesive layer. Vascularization was achieved using the Vaporization of Sacrificial Components (VaSC) method. See Esser-Kahn, A. P., P. R. Thakre, H. Dong, J. F. Patrick, V. K. Vlasko-Vlasov, N. R. Sottos, J. S. Moore, and S. R. White. 2011. "Three-Dimensional Microvascular Fiber-Reinforced Composites," *Adv. Mater.*, 23(32):3654-8; US Patent Application Publication No. US 2013/0065042 A1; and Gergely, R. C. R., S. J. Pety, B. P. Krull, J. F. Patrick, T. Q. Doan, A. M. Coppola, P. R. Thakre, N. R. Sottos, J. S. Moore, and S. R. White. 2015. "Multidimensional Vascularized Polymers using Degradable Sacrificial Templates," *Adv. Funct. Mater.*, 25(7):1043-52, each of which is incorporated herein in its entirety.

The thickness of each layer, as well as the channel sizes and spacing, are variable and the dimensions given in the figures are specific to the experiments disclosed herein. The vascular network can also be designed with single or multiple inlets and one or more branching channels, similar to the venation in a leaf. See (b) of FIG. 3. The porous titanium layer was bonded to the structural composites using a vascularized adhesive interlayer. The interlayer can be composed of neat epoxy or PMC. The channels in the adhesive layer were in contact with the pores in order to allow for liquid to flow between them. While the specimen measures ca. two inches by three inches, specimens spanning larger areas (e.g., on the order of meters) should also work.

Example 3—Assembly of Specimen A

A procedure to assemble a system specimen is shown in FIG. 5. (Compare FIG. 6 discussed in Example 4 below) In Step 1, the sacrificial template is bonded to the porous protective layer (alumina, titania or titanium) by partially dissolving the surface of the PLA in dichloromethane (DCM), then applying moderate pressure and allowing the DCM to evaporate off at room temperature overnight. In Step 2, the glass fiber PMC is bonded to the system network using an epoxy adhesive. The adhesive is composed of EPON 834:EPON 828 epoxy (Bisphenol A based, Hexion Inc.) mixed in a ratio of 100:50 by mass, then mixed with EPIKURE 3300 curing agent (Cycloaliphatic Amine based, Hexion Inc.) in a ratio of 100:19 by mass. Blending EPON 828 and EPON 834 tuned the viscosity of the adhesive, making it workable, while having sufficient viscosity to avoid filling the pores prior to setting. The adhesive was cured at room temperature for 24 h, then at 82° C. for 1.5 h and 121° C. for 1.5 h in a convection oven with ramp rates of 1° C./min. In Step 3, the specimen was trimmed to size, exposing the sacrificial template. Then, the sacrificial template is removed by the VaSC process at 200° C. for 10 h under vacuum. Following VaSC, PLA residue is cleaned from the porous ceramic by soaking the specimen in 2M NaOH in deionized water for 3 h at 50° C., then rinsing with deionized water. A resulting specimen is shown in (b) of FIG. 3.

Example 4—Assembly of Specimen B

Figure 6:
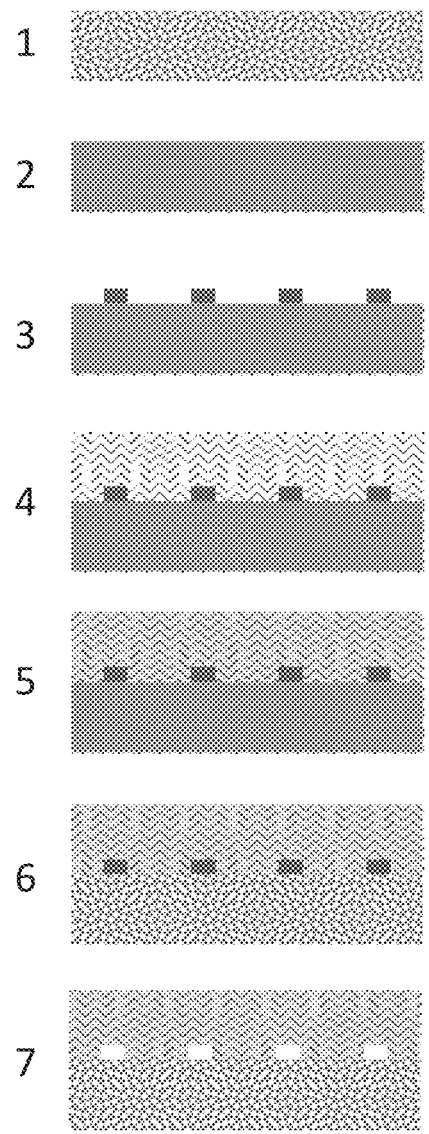
FIG. 6 shows a schematic procedure to manufacture an autonomic cooling system specimen (Specimen B).

FIG. 6 shows a schematic procedure for the manufacture of an autonomous cooling system specimen. (Compare FIG. 5 discussed in Example 3 above.) The order of the following process can sometimes be changed or certain steps can be modified, added or omitted depending on the application desired.

In Step 1, a porous titanium material is received. In Step 2, a pore filler (protector) can be applied to the titanium and one surface of the titanium is sanded to clean and ready it for bonding. Examples of pore fillers (protectors) include additives, such as alcohols and polymers, which help prevent unwanted filling in or around of the pores by other ingredients utilized in the manufacturing process. One specific example of an alcohol pore protector is isomalt. (isomaltitol). Isomalt (a sugar alcohol) is used as a water-soluble pore filler in order to protect the integrity of the pores when the porous material is bonded to a structural composite. Note that bonding the sacrificial material to the surface connects the vascular network to the porous network of the system. Isomalt is solid at room temperature, melts at elevated temperature for infiltration into the pores, and can be dissolved by water, but not epoxy. In Step 2, isomalt was applied to fill the titanium pores. In Step 3, a sacrificial pattern of the vascular network composed of polylactic acid (PLA)/tin (III) oxalate ($SnO_x$) was bonded to the sanded surface by partially dissolving the PLA in dichloromethane. In Step 4, layers of fiber-glass (or carbon fiber) were placed on the surface of the titanium containing the sacrificial pattern. In Step 5, epoxy was vacuum infused into the fiber-glass and allowed to cure to create a glass fiber reinforced epoxy composite. In Step 6, the isomalt was removed by dissolving it in water to open up the pores of the titanium. In Step 7, the sacrificial PLA/$SnO_x$ pattern (template) was removed by placing the specimen in a vacuum over for ca. 12 h at 200° C. The specimen was then cleaned in a 2M NaOH bath for 3H at 50° C.

Example 5—Test Set-Up

Figure 7:
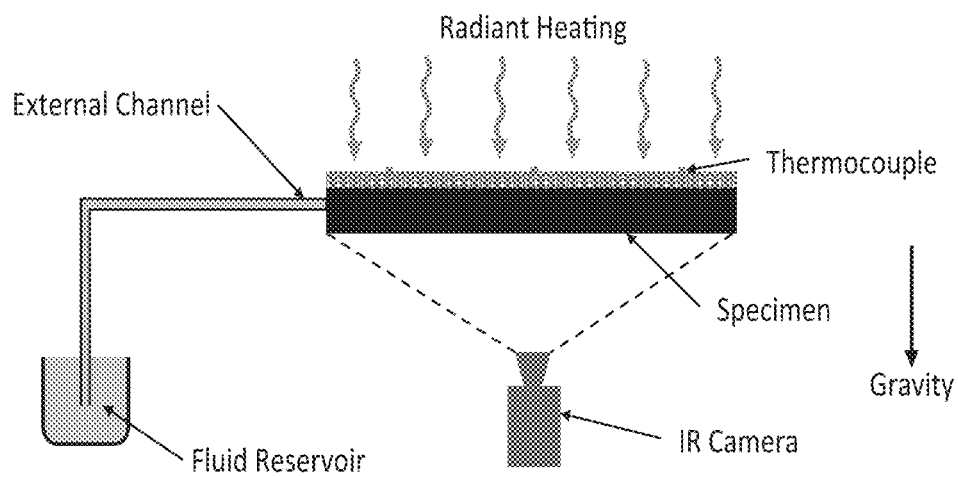
FIG. 7 shows a schematic of an experimental test set-up of the autonomic cooling system.

FIG. 7 shows a schematic experimental test set-up. (Compare FIG. 13, infra.) The porous thermal protective layer was heated by a radiative heater (Precious Control Systems Inc., Model 5080). The heat flux of the heater was calibrated using a heat flux sensor (Vatell Corp., Model TG 1000-1). The heat flux supplied is $q_s''$. On the opposite side, the temperature field of the composite was measured using an infrared (IR) camera (FLIR Systems, Model 620). The reservoir was connected to a specimen using 500 μm inner diameter, 60 cm long EVA tubing. The reservoir was placed 10 cm below the specimen, relative to gravity. During an experiment, the system was first filled with water, being sure to essentially remove all of the air from the system. Then, the heat was turned on and the heat flux was varied. A microporous thermal protective layer of the specimen was heated with a radiative heater, while an IR camera measured a temperature field on the opposite side of the specimen (non-heated, composite face). Thermocouples placed in the vascular network measure the water temperature. Water is drawn into the internal vasculature from the reservoir through an external channel of a pre-determined length and pre-determined height from the micro-porous layer to the top of the reservoir. The mass change of the reservoir can be measured by a scale (not shown). Cooling occurred as water evaporated from the heated surface and was replaced by water drawn from the external reservoir by capillary action.

Example 6—Temperature Graph with Increasing Heat Flux

Figure 8:
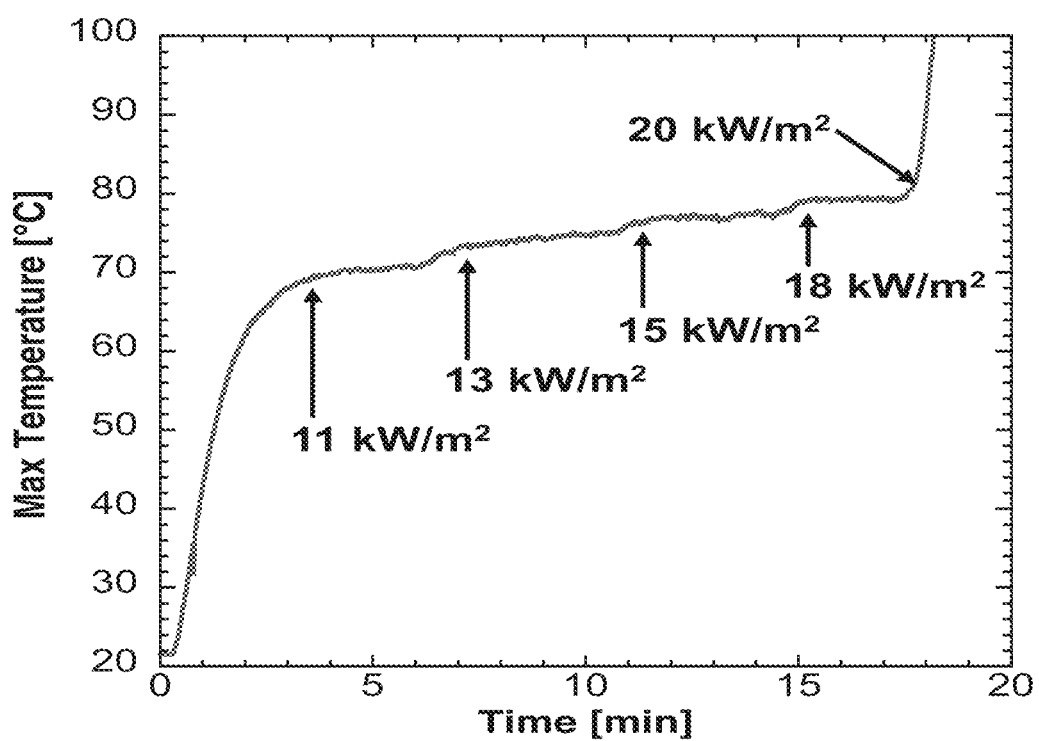
FIG. 8 shows the adaptability of the autonomic cooling system to changing thermal conditions.

FIG. 8 shows the maximum IR temperature as a function of time as the heat flux is incrementally increased. Max temperature is the maximum temperature as measured by the IR camera on the PMC's face. As the heat flux is changed, the system continues to cool with only slight increases in temperature. Once the heat flux is too high, boiling occurs in the vascular channels and cooling stops, overheating the system. Even when the heat flux increased from 11 to 18 kW/m², the temperature only increased from 70° C. to 79° C. At 20 kW/m², boiling occurred in the channels and cooling stopped. This point represents the maximum point of operation for this particular set-up of the autonomic cooling system.

Example 7—Graph of Heat Flux and Channel Spacing

Figure 9:
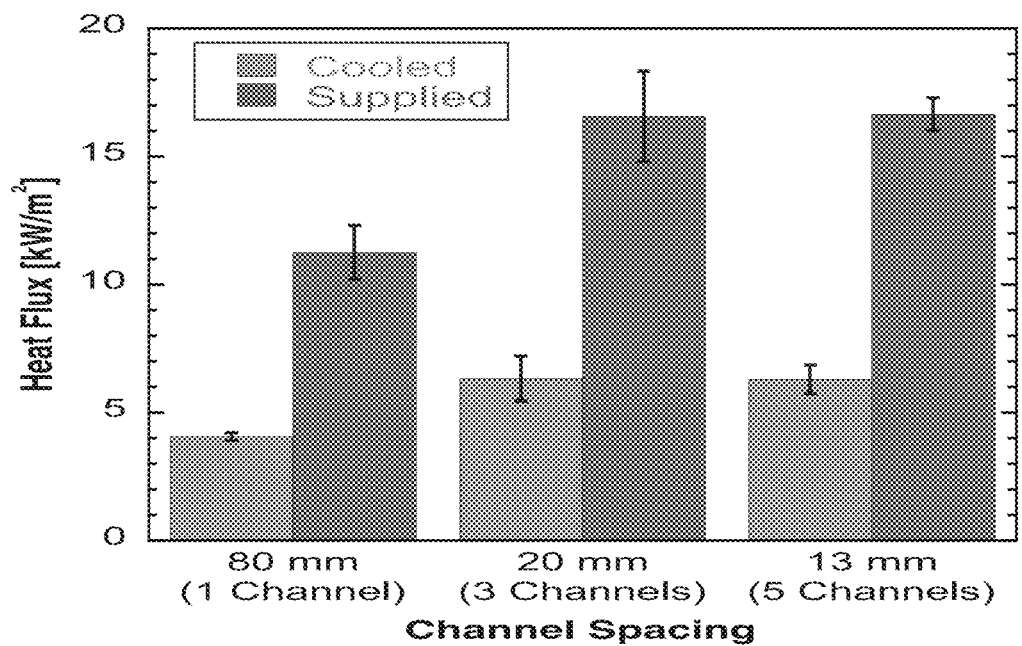
FIG. 9 shows the heat flux at overheat as a function of distance between the channels.

FIG. 9 shows that the autonomous cooling system cannot sustain an infinite amount of heat. When the heat supplied is too high, the liquid can boil in the vascular channels or the total resistance to flow can exceed the capillary pressure. We call this scenario "overheat." The data in this figure shows the heat flux at overheat as a function of the distance between the channels. Channel spacing in this specific experiment is controlled by only supplying fluid to some of the channels shown in FIG. 4. This data shows that performance can be affected in part by the spacing of the vascular channels.

Example 8—Graph of Surface Temperature Vs Time

Figure 10:
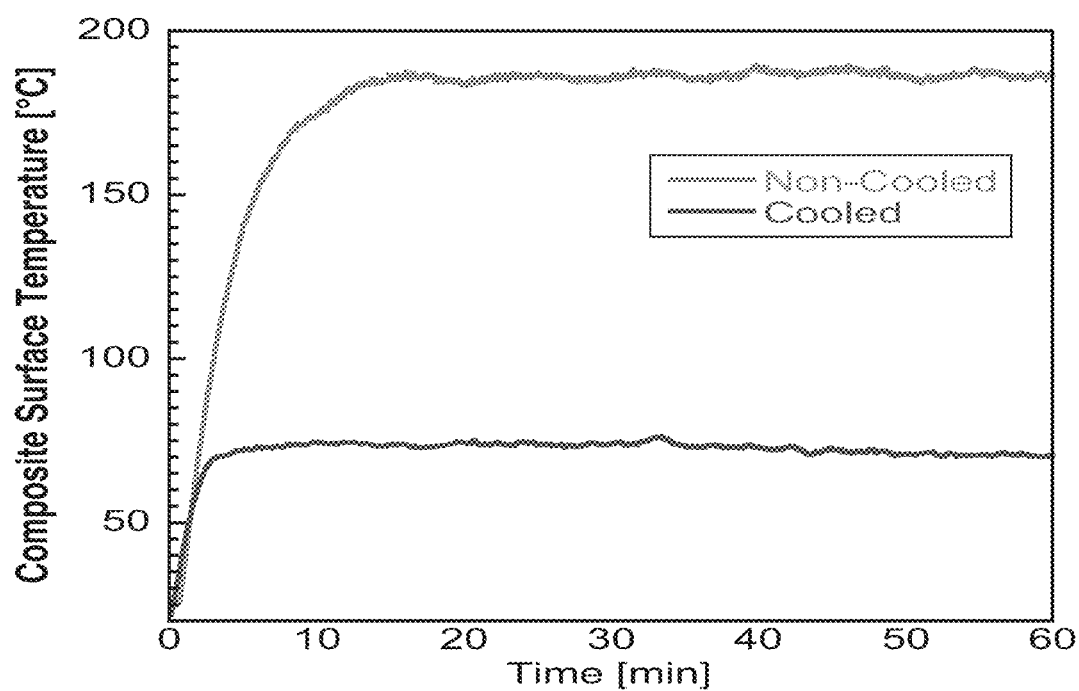
FIG. 10 shows a comparison between surface temperatures as measured by an infrared (IR) camera on the composite faces of non-cooled vs. cooled samples.

FIG. 10 shows a comparison between surface temperature as measured by the IR camera on the composite face for a non-cooled vs. cooled sample. The samples were identical, except that no water was introduced into the porous layer in the non-cooled case. The temperature for the cooled system was significantly below that of the non-cooled sample as a result of the energy removed by evaporation.

Example 9—Graph of Reservoir Mass Change Vs Time

Figure 11:
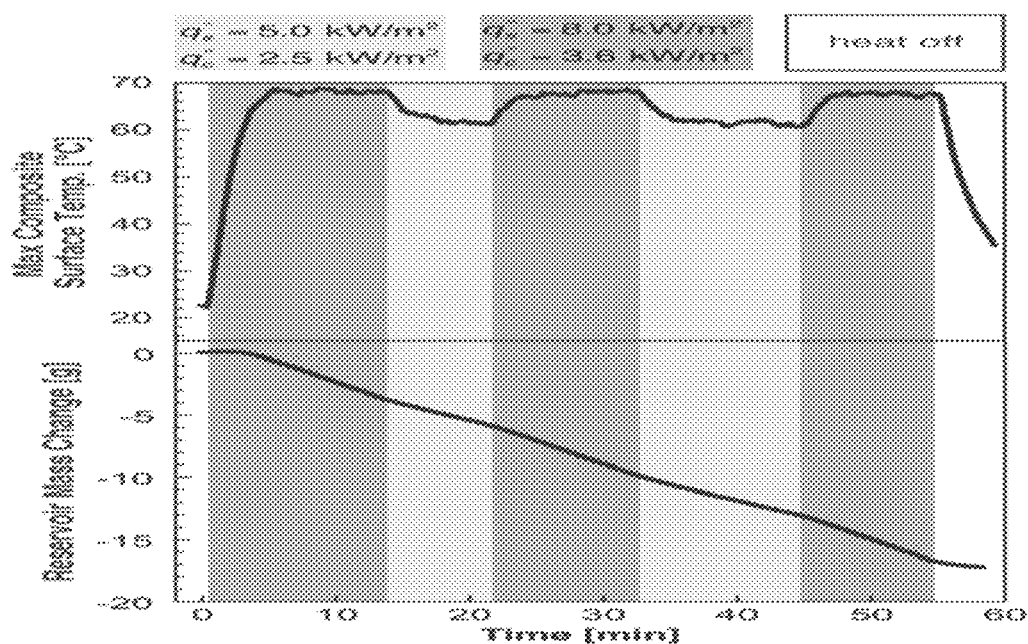
FIG. 11 shows the reservoir mass change during an experiment run.

FIG. 11 shows that the reservoir mass changes as a function of time as the heat flux is changed during a single experiment. The liquid flow rate (flow rate is equal to the slope of the mass change vs. time curve) changes in response to a change in supplied heat flux. In addition, comparing the surface temperature as the heat flux is changed showed that the surface temperature was only slightly changed.

Example 10—Specimen Manufacture Procedures 10.1 Sacrificial Template Material Preparation The sacrificial template of the vascular network was cut from PLA/SnOx sheets (CU Aerospace) using a laser cutter (Full Spectrum Laser LLC, Model: Pro LF Series. CO2 laser, 90 W). The sheets came with thickness varying from 600-800 The sheets were cut into 140 mm×140 mm squares and then flattened in a hot press for 20 minutes at 80° C. between two aluminum plates spaced by 500 µm thick spacers. The resulting sacrificial sheets were 540-560 µm thick. The laser cut along lines defined by vector-based 2D patterns of the desired network. The channels in the network pattern were drawn 120 µm wider than the desired channel width to account for material removed by the laser. The laser was set to a power of 15% and speed of 70%.

10.2 Porous Material Preparation

Figure 12:
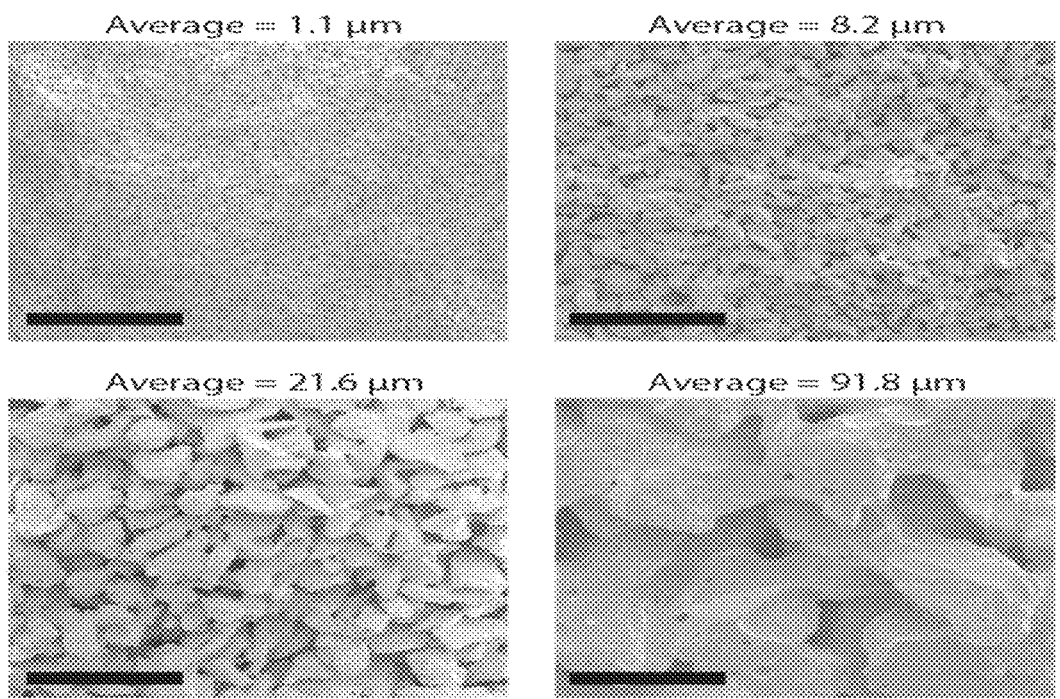
FIG. 12 shows SEM images of four different sizes of porous ceramic sheets.

Porous ceramic sheets were obtained commercially (Refractron Technologies Corp., New York) with four different average pore sizes. The sheets were composed of 87% alumina, 8% silica, and 5% "other material" and had a porosity of 43%, according to the manufacturer. SEM images (5 KeV, 100× magnification, secondary electron detector) four sizes of porous ceramic sheets are shown in FIG. 12. The scale bar equals 500 Note that the morphology of each sheet is similar and the primary difference is seen in the particle size. Sheets were cut to size using a water cooled diamond saw, taking care to only expose the sheets to clean deionized water to prevent contamination. All sheets were 2 mm in thickness.

Table 1 summarizes the properties of the sheets. Bubble point designates the pressure required to force an air bubble through the wick when saturated with a liquid. The bubble point is analogous to the maximum capillary pressure sustainable by the largest pore in the porous ceramic with the designated fluid. Based on the bubble point for Galwick™ wetting liquid, the capillary pressure of the porous ceramic containing water was calculated using Equation (6) assuming the contact angles were equal (Galwick™ surface tension=15.9 dyn/cm):

$$\Delta P_{cap} = \frac{2\gamma \cos(\theta)}{R_P}, \quad (6)$$

where γ is the air water surface tension, θ is the contact angle between the solid and the liquid, and $R_p$ is the pore radius.

TABLE 1

| | Manufacturer data and calculated bubble point pressure for water for the porous ceramic sheets | | | | |
|---|---|---|---|---|---|
| Manufacturer Designation | Mean Diameter [µm] | Mode Diameter [µm] | Bubble Point Diameter [µm] | Bubble Point Pressure (Galwick at 20° C.) [psi] | Bubble Point Pressure (Water at 100° C.) [Pa] |
| AF6 | 1.1 | 0.20 | 7.62 | 0.866 | 22,100 |
| AF15 | 8.2 | 5.4 | 25.1 | 0.262 | 6,690 |
| AF30 | 21.6 | 18.3 | 71.3 | 0.093 | 2,380 |
| AF90 | 91.8 | 77.9 | 244 | 0.027 | 690 |

10.3 PMC Manufacture

PMC substrates were manufactured from 12 layers of 7781 style woven E-glass (Fiber Glast Developments Corporation) infused with Huntsman 8605 epoxy resin system using VARTM. Araldite 8605 resin (Bisphenol A epoxy resin/Butanedioldiglycidyl ether) and Aradur 8605 curing agent (2,2'-Dimethyl-4,4'methylenebis(cyclohexylamine)) were mixed in a ratio of 100:35 by mass and degassed for 1 h at room temperature. Following infusion, the resin was cured at room temperature for a minimum of 24 h, then placed in an oven and further cured at 121° C. for 2 h and 177° C. for 3 h with temperatures ramps of 1° C./min. The PMCs had an average fiber volume of 49.5% as measured by matrix burn-off. Thickness of the final PMCs were between 2.6-2.7 mm. PMCs panels were cut to size using a water-cooled diamond saw.

Example 11—Testing and Analysis Procedure 11.1 Test Set-Up

Inspired by the biology of evaporative cooling seen in nature, we have designated the autonomic cooling system described herein as Transpirational Autonomic Cooling (TAC). The TAC system was tested using the set-up shown schematically in FIG. 7 and discussed in Example 5 above. Images of the specimen and testing set-up are shown in FIG. 13, illustrating (a) the specimen, specimen mounts, thermocouples, heater and inlet, and (b) the reservoir.

Heat was applied to the micro-porous layer (of the specimen) by a radiative heater (Precision Control Systems Inc., Model 5080 heater and Model 5620-11-SP34 controller), which was placed 25 mm from the face. The heater was calibrated according to the procedure described above. During testing, the edges of the specimen were masked with aluminum foil tape to prevent direct heating. The temperature profile on the opposite side of the specimen was imaged with an IR camera (FLIR, Model SC620). Fluid temperature was measured by placing a 254 μm diameter type T thermocouple (Omega Engineering, Model TMQSS-010U) into the vascular network sealed with epoxy (3M, model DP100NS). The thermocouple was small enough to avoid blocking liquid flow. Thermocouple data was collected using thermocouple readers (Phidgets, Model 1048) and recorded using a custom LabVIEW code (National Instruments) at 1 Hz.

Figure 13A:
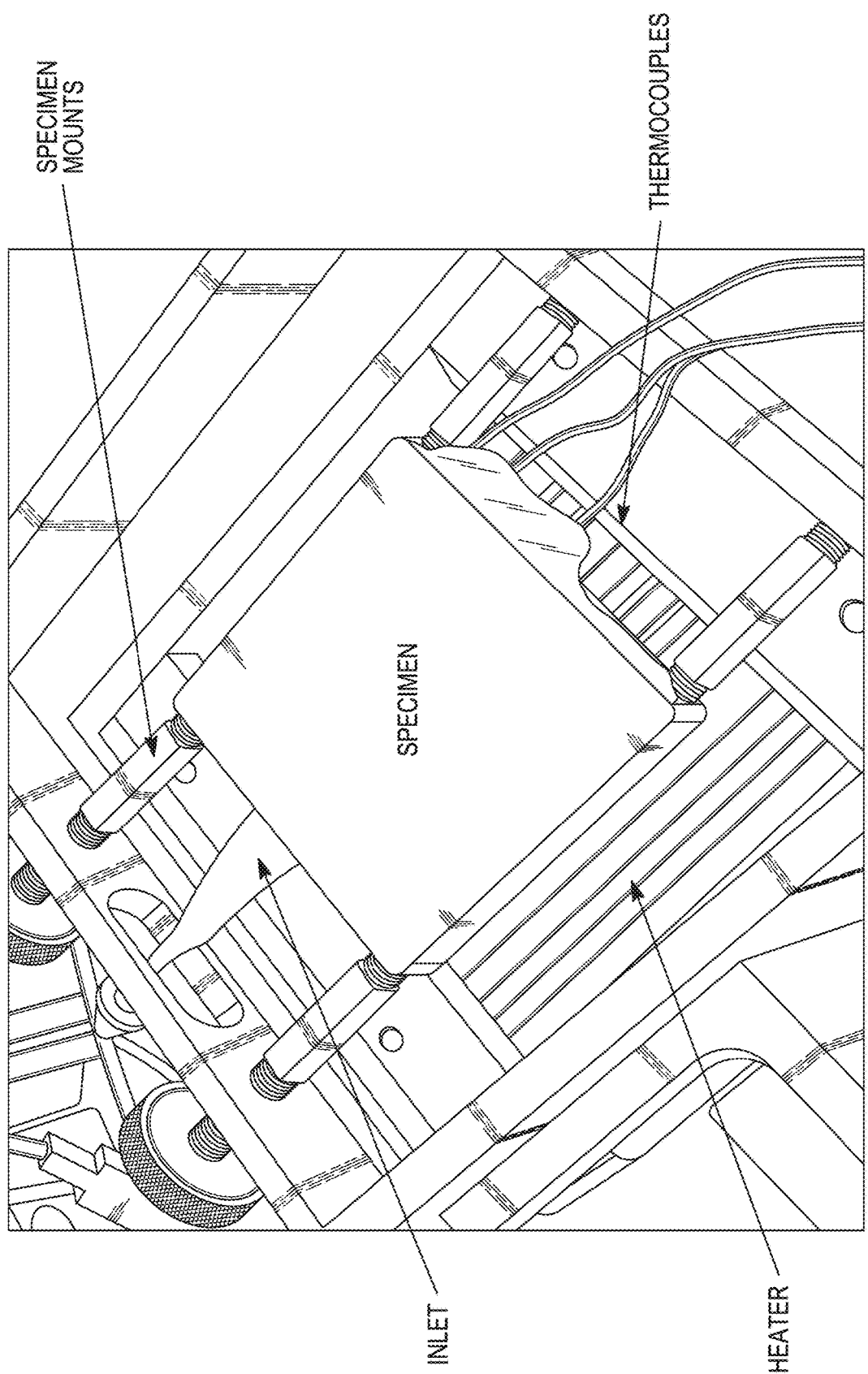
FIG. 13A-B show images of an autonomic cooling system specimen and a testing set-up. (a) Specimen, specimen mounts, thermocouples, heater and inlet, and (b) the reservoir.
Figure 13B:
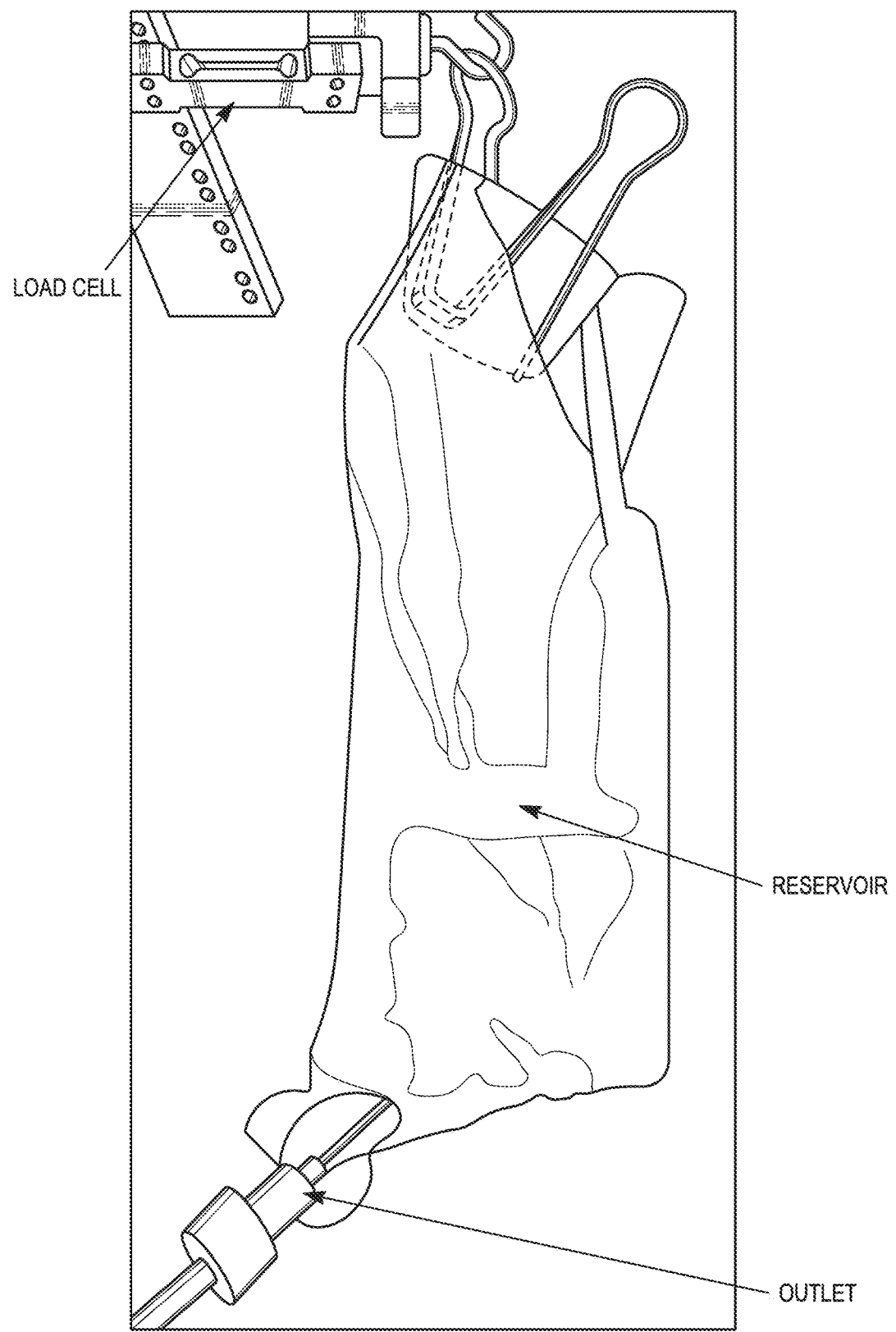

In FIG. 13, (a) shows an open view of the specimen and testing set-up, and (b) shows a flexible reservoir (similar to a syringe bag) stored with water. This was created by sealing a 14 gage syringe needle (McMaster-Carr, part #75165A671) in a 7.5 cm×10 cm polyethylene bag (McMaster-Carr, part #1928T65) using hot melt adhesive (McMaster-Carr, part #7518A56). The bag was then filled with boiling deionized water, briefly cooled in a bath of room temperature water, briefly sonicated to remove bubbles from pouring, heat-sealed, then further cooled to room temperature. Filling with boiling water removed dissolved gas. Using a flexible bag prevented air from returning into solution while also preventing a vacuum from forming in the reservoir as water was removed for cooling. The reservoir was connected to the specimen using flexible tubing (McMaster-Carr, Part #1883T4) of diameter $D_{ch}$. A section of the tubing was inserted approximately 1 mm into the inlet of the vascular network by drilling out the end of the channel. The connection was then sealed with epoxy adhesive (3M, model DP100NS). The length and diameter of the tubing and height between the specimen and the reservoir were recorded during testing. The mass of the reservoir was recorded using a cantilevered single-point load cell (Phidgets, model 3139_0, 100 g capacity, ±50 mg precision) excited by a Wheatstone bridge (Phidgets, model 1046_0) and data recorded using a custom LabView code (National Instruments).

Filling the specimen with water from the reservoir prior to testing required care to essentially remove all of the air between the reservoir and the surface of the micro-porous layer. A schematic of the set-up for this procedure is described in FIG. 14. The goal was to draw all of the air into the syringe, leaving only water between the reservoir and the specimen. Thicker lines designate the large diameter tubing not accounted for in the measurement of L, while the thinner line designates the section of tubing recorded for L. The tubing used for this set-up (McMaster-Carr, Part #1883T5, diameter=1.58 mm) was significantly larger in diameter than the tubing connected to the specimen and its length was not accounted for in the measurement of L because the pressure drop was negligible. The filling procedure is as follows. First, Valve 1 was opened and the section of tubing between the valve and the reservoir was filled with water. Then, Valve 1 was closed and Valve 2 was opened. The specimen was place in a container filled with recently boiled water and the water was drawn into the tubing using the syringe, pulling out air bubble in the process. Once no more air was removed, Valve 2 was closed and Valve 1 was opened, making the specimen ready for testing.

Figure 14:
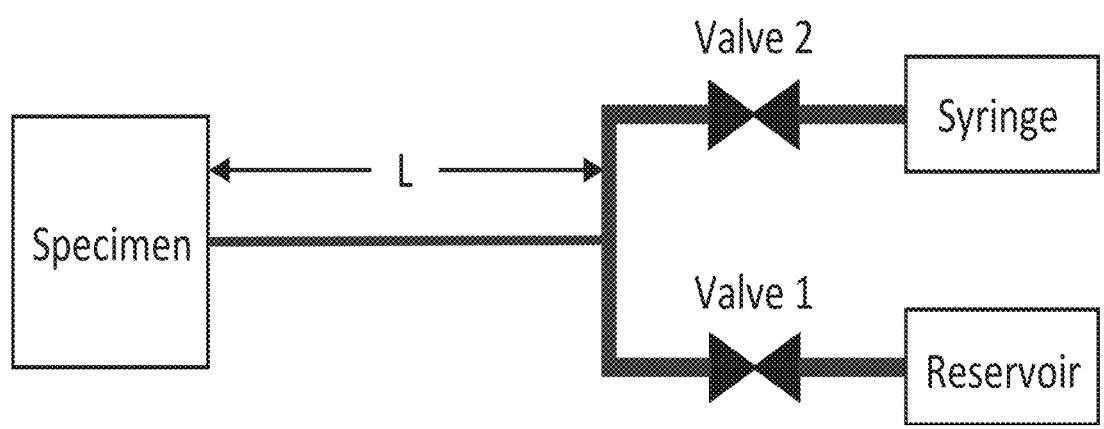
FIG. 14 shows a schematic procedure to fill an autonomic cooling system specimen with water.

FIG. 13 (specimen, test set-up and reservoir) and FIG. 14 (how to fill the specimen) show certain ways to design and operate aspects of the invention. There are other ways to accomplish the same effect. For example, a skilled artisan could employ different types of reservoirs and different ways to fill the reservoir and specimen.

11.2 Test Procedure and Data Analysis

During a typical test, the system was charged with water and then the heater was set to a constant heat flux. The IR temperature profile, the fluid temperature, the absorbed heat flux, and the mass flow rate were recorded. FIG. 15 shows a typical temperature profile recorded during a cooling test with the IR camera. The maximum temperature from the IR camera was chosen as the representative temperature when a single temperature value was required. The maximum temperature was measured in the region of interest marked in the figure. Using the reservoir mass data recorded by the thermocouple, the cooled heat flux was calculated using Equation (7):

$$q_c'' = \frac{dm}{dt} h_v / A_s \qquad (7)$$

where m is the mass of the reservoir, t is time, and $A_s$ is the heated area of the specimen. The heat flux absorbed by the alumina-based microporous layer ($q_\alpha''$) was calculated from the heat flux supplied by the heater ($q_s''$) using Equation (8):

$$q_\alpha'' = \varepsilon_F q_s'' \qquad (8)$$

where $\varepsilon_F = 0.57$ is the emissivity of the alumina layer as calculated based on mathematical formulae and experiments.

Conditions leading to overheat were evaluated using a time-to-failure type test. The time-to-overheat was measured as the time between start of fluid flow and a sudden flat line in the reservoir mass vs. time data $$\left(\frac{dm}{dt} = 0\right).$$

Example 12—Cooling Performance

The cooling effect of the TAC system on the temperature of a PMC is revealed in FIG. 16 and FIG. 17.

FIG. 16 shows the transient cooling performance of the transpirational autonomic cooling PMC compared to non-cooled PMCs:
  (a) shows the maximum IR temperature for control and TAC samples and fluid evaporated by the cooled specimen as a function of time; and
  (b) shows the IR temperature profiles for the same samples at various times.

The sample measured 60 mm×60 mm and contained a single straight channel in the center of the specimen measuring 500 μm high by 2000 μm wide. H=5 cm, L=12.5 cm, $D_{ch}$=508 μm, pore size=AF6, $q_\alpha''$=20.6 kW/m$^2$, and $q_c''$=17.3 kW/m$^2$.

In (a) of FIG. 16, (a) the transient temperature response of the TAC sample under constant heat flux is compared to a non-cooled control sample. At $q_\alpha''$=20.6 kW/m$^2$, the temperature of the control sample exceeded the $T_g$ of the PMC after just 3 minutes. In contrast, the TAC sample remained well below $T_g$ even at steady state. While cooling under a constant heat flux, the TAC system evaporated water at a constant rate. The IR images in (b) of FIG. 16 compare the temperature field of the two samples. The control sample was hottest in the center and cooler towards the edges as a result of heat lost to the environment and the clamping fixture. The TAC sample was coolest near the vascular channel as a result of convective cooling provided by the inflow of water.

FIG. 17 shows the steady state cooling performance of the transpirational autonomic cooling PMC compared to non-cooled PMCs:
  (a) shows the maximum IR temperature at steady state as a function of supplied heat flux for control and cooled specimens; and
  (b) shows the fluid temperature 15 mm from end of channel and cooled heat flux as a function of supplied heat flux.

The samples measured 60 mm×60 mm and contained a single straight channel in the center of the specimen measuring 500 μm high by 2000 μm wide. H=5 cm, L=12.5 cm, $D_{ch}$=508 μm, and pore size=AF6.

In (a) of FIG. 17, a comparison of the maximum temperature at steady state for the control and TAC samples as a function of heat flux is shown. The temperature of the control sample increased fairly linearly and reached 240° C. under $q_\alpha''$=17.5 kW/m$^2$, a temperature well above the $T_g$ and nearing the point of thermal degradation of the epoxy. The temperature of the TAC initially increased quickly with increasing heat flux, but then increased only gradually at higher heat fluxes. At $q_\alpha''$=30.2 kW/m$^2$, the maximum temperature was only 91.3° C. In (b) of FIG. 17, the fluid temperature and cooled heat flux as a function of supplied heat flux is shown. The fluid temperature shows similar behavior to the PMC surface temperature, increasing quickly at low heat fluxes, then more gradually at higher heat flux. The fluid temperature was 96° C. at $q_\alpha''$=30.2 kW/m$^2$. Under these conditions, the saturation temperature ($T_{sat}$) of the fluid in the vascular network was calculated to be 95.9° C. Overheat occurred when the heat flux was greater than 30.2 kW/m$^2$ ($q_\alpha''$>30.2 kW/m$^2$), indicating that the temperature of the fluid in the vascular network ($T_{fluid}$) is greater than $T_{sat}$ ($T_{fluid}$>$T_{sat}$). The cooled heat flux increased linearly with incident heat flux.

This experiment shows that the temperature of a PMC utilizing TAC can be maintained below 100° C. up to a heat flux of about 30 kW/m$^2$. In contrast, the temperature of a non-cooled PMC would exceed 100° C. at a heat flux of about 5 kW/m$^2$ and reach about 240° C. at a heat flux of about 16 kW/m$^2$.

Example 13—Autonomic and Adaptable Operation

An advantageous feature of the TAC system is its functionality to autonomically adapt to changing heat loads.

13.1—Autonomic Operation

FIG. 18 shows that the maximum surface temperature measured by the IR camera changes as a function of time during an experiment (different from the experiments run in FIG. 10 and FIG. 11). When heat is applied to the thermal protective layer, flow starts in response to evaporation at the heated surface. When the heater is turned off, flow stops without any external intervention. The sample measured 60 mm×60 mm and contained a single straight channel in the center of the specimen measuring 500 μm high by 2000 μm wide. H=5 cm, L=12.5 cm, $D_{ch}$=508 μm, pore size=AF6, $q_\alpha''$=11.4 kW/m$^2$, and $q_c''$=9.42 kW/m$^2$ (refer to section 15.2 for explanation of these values). When the specimen was exposed to heat, fluid began to evaporate from the surface, cooling the specimen. When the heat was removed, the flow rate reduced back toward zero as the specimen temperature reduces.

These results show that the TAC system can self-start and self-stop upon a heating source being turned on and off, respectively. Flow starts as sufficient heat is applied and stops when no heat is applied. In addition to self-starting and stopping, the system can adapt to changing heat loads by autonomically adjusting the evaporation rate proportionally.

FIG. 19 shows the adaptability of the TAC system to changing heat load. As the heat flux is increased, the temperature and the flow rate increase proportionately to the increase in heat flux. When heat flux is reduced back to 5.7 kW/m$^2$, the temperature and flow rate reduce to the same level as early in the test. The sample measured 60 mm×60 mm and contained a single straight channel in the center of the specimen measuring 500 μm high by 2000 μm wide. H=5 cm, L=12.5 cm, $D_{ch}$=508 μm, and pore size=AF6. FIG. 19 shows that as the heat flux applied to the specimen increased, the evaporation rate increased proportionally to remove more heat. The temperature of the specimen increased with increased absorbed heat flux, but non-linearly, as was demonstrated in (a) of FIG. 17. The cooled heat flux increased with increased absorbed heat flux and reduced back to its original level when the supplied heat flux was reduced from 17.5 to 5.6 kW/m$^2$. Similar adaptability was observed when changing the area being heated, rather than changing the heat flux over the entire sample.

13.2—Localized Heating

FIG. 20 shows the effect of localized heating on an autonomous cooling system specimen as illustrated by (a) IR images and (b) fluid evaporation as a function of time. In (i), the entire specimen is heated. In (ii)-(iv), only a small area marked by the circle is heated by masking off the rest of the specimen. In (v)-(viii), the area of heating is moved to different locations. In (viii)-(ix), the entire specimen is heated again. The sample measured 60 mm×60 mm and contained the vascular network shown in (b) of FIG. 3. H=5 cm, L=12.5 cm, $D_{ch}$=508 μm, pore size=AF6, $q_\alpha''$=8.50 kW/m$^2$ in (i) and (ix) (refer to section 15.2 for explanation of these values). FIG. 11 shows that when only a small area of the sample is heated, the evaporation rate of the fluid is reduced. In contrast, during conventional active cooling, fluid is pumped through all of the channels, regardless of whether the entire specimen is heated if only one fluid inlet exists. The system is able to operate when only heated over a portion of its surface.

These results show that when only a small area of the sample was heated, the evaporation rate of the fluid was reduced, providing an energy efficient means of operation. In contrast, during traditional active cooling, fluid is pumped through all of the channels, regardless of whether the entire specimen is heated if only one fluid inlet exists. Another useful feature of the TAC system is its ability to hook up multiple specimens to a single reservoir. This is advantageous for large systems requiring cooling in several distinct regions, for example, two wings of an aircraft.

FIG. 21 shows the operation of multiple TAC specimens drawing from the same reservoir. IR images on the top of the plot show a schematic of the specimens, with a varying number of specimens being heated. Dashed lines mark the transitions from 1 to 2 to 3 then to 1 heated specimens. Values in the box correspond to the total cooled heat flux for all heated samples (i.e. only the area of the heated samples is considered). The sample measured 30 mm×30 mm and contained a single straight channel in the center of the specimen measuring 500 µm high by 2000 µm wide. The channels and corresponding inlets are marked by dashed lines and arrows on the first set of IR images, respectively. H=5 cm, L=12.5 cm, $D_{ch}$=508 µm, pore size=AF6, $q_{\alpha}"$=11.4 kW/m². FIG. 21 shows the operation of the TAC system when multiple specimens are connected to a single reservoir. At first, only one specimen was heated and the fluid evaporation rate was low. As two, then three, specimens are heated, the flow rate increased proportionally to the added area. When heat was removed from two specimens so that only one specimen was heated, the flow rate returned back to its original level.

Example 14—Effect of Pore Diameter

FIG. 22 shows the maximum operation conditions as a function of average pore diameter:
(a) Time-to-overheat as a function of absorbed heat flux. Tests were conducted to a maximum of 3600 s (1 h), after which, tests were designated "did not overheat"; and
(b) Bounds for maximum absorbed heat flux at overheat as a function of average pore diameter. Bounds are established by the maximum heat flux under which overheat did not occur and the minimum heat flux where overheat did occur.

Samples measured 60 mm×60 mm and contained a single straight channel in the center of the specimen measuring 500 µm high by 2000 µm wide. H=10 cm, L=50 cm, and $D_{ch}$=508 µm (refer above for explanation of the values).

Heat flux at overheat varies as a function of the pore size and better performance can be achieved by optimizing the pore size.

Example 15—Height

Figure 23:
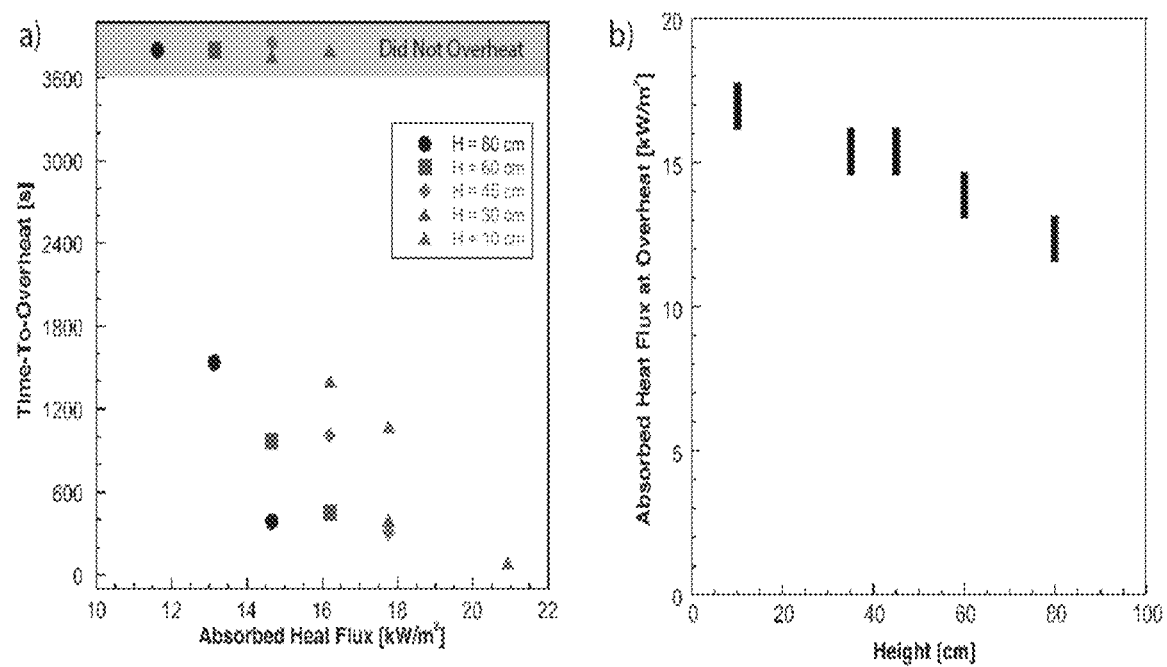
FIG. 23 shows the maximum operation conditions as a function of height (H).

FIG. 23 shows the maximum operation conditions as a function of height (H):
(a) Time-to-overheat as a function of absorbed heat flux. Tests were conducted to a maximum of 3600 s (1 h), after which, tests were designated "did not overheat"; and
(b) Bounds for maximum absorbed heat flux at overheat as a function of height. Bounds are established by the maximum heat flux under which overheat did not occur and the minimum heat flux where overheat did occur.

Samples measured 60 mm×60 mm and contained a single straight channel in the center of the specimen measuring 500 µm high by 2000 µm wide. L=100 cm, $D_{ch}$=508 µm, and average pore size=1.1 µm (refer above for explanation of the values).

Heat flux at overheat varies as a function of the height between the reservoir and the porous layer. The larger this height, the lower the heat flux that can be cooled. It is hypothesized that performance of the system can be optimized by increasing the capillary pressure and decreasing the flow resistance. The pressure loss through the vascular network and the microporous layer can be minimized by altering the geometry of the system. Large channel and pore diameters could reduce these pressure drop terms. However, large pores also can reduce the capillary pressure, negating any benefits. Rather than increasing the pore size, one could instead create a branching network of one or more vascular channels over the surface of the microporous layer.

The TAC system could lose some water through evaporation at room temperature conditions. In addition, water could syphon out of the surface if the reservoir is above the microporous layer. These two issues could be addressed by creating a skin layer containing autonomously activated pores that open when heat is applied and close when heat is removed. These types of pores would not need to hold water for capillary action, but instead would act as a fluid barrier when the system is at room temperature.

The above experiments used radiative heating because of its repeatable and predictable heat transfer. However, radiative heating may be combated in certain situations, such as by a substrate containing a reflective surface. In such situations, the microporous layer may be heated via convection or conduction (e.g., useful for encapsulated electronics). Convection heating should be readily handled by the TAC system. However, conductive heat sources could modify some of the principles of the system because some of the pores could be blocked in the area of thermal contact. Accordingly, modifications to the system may be advantageous when conduction heating is applied. To minimize the risk of pore blockage, another configuration would be to heat the PMC, rather than the microporous layer. This type of configuration would allow for conductive heating of the TAC system without the danger of blocking the pores. Furthermore, when heating the microporous layer, the temperature in the PMC is capped at the saturation temperature of the water (typically ca. 100° C.). However, the PMC temperature may greatly exceed that when the PMC is heated directly. The primary risk in this configuration is that evaporation may occur on the wrong side of the microporous network, filling the channels with vapor, which could potentially impair the system at high heat fluxes or after a long period of operation. This risk may be minimized by selecting an appropriate through-thickness thermal conductivity of the PMC.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications can be made while remaining within the spirit and scope of the invention.

What is claimed is:

1. An autonomic cooling system comprising a fluid-containing reservoir connected to a material containing the fluid,
the fluid comprising a cooling liquid; and
the material comprising:
(a) a porous thermal protective layer;
(b) a structural or non-structural substrate:
(i) the structural substrate comprising a metal, ceramic, polymer matrix composite (PMC), or a combination thereof; and
(ii) the non-structural substrate comprising a non-natural elastomer; and
(c) a vascularized layer integrated between the protective layer and the substrate,
such that the vascularized layer is in direct contact with the protective layer;
where the system autonomically cools the material upon an application of sufficient heat from a heat source to the material, whereby the vascularized layer disperses the cooling liquid throughout enough of the protective layer to produce a pressure gradient between the reservoir and the pores of the protective layer, the cooling liquid in the protective layer evaporates to remove the applied heat, and the cooling liquid lost by the evaporation is replaced via capillary pressure drawing fluid from the reservoir to the vascularized layer.

2. The system of claim 1, where the fluid comprises water, an alcohol, a glycol, an aldehyde, an amine, an amide, or a combination thereof.

3. The system of claim 2, where the fluid comprises water.

4. The system of claim 1, where the substrate comprises the PMC.

5. The system of claim 4, where the PMC comprises fiber-glass, carbon fiber, an epoxy resin, or a combination thereof.

6. The system of claim 5, where the PMC comprises a combination of the epoxy resin with the fiber-glass or the carbon fiber.

7. The system of claim 6, where the PMC has been bonded to the protective layer via an epoxy adhesive.

8. The system of claim 6, where the vascularized layer has been integrated into the system by (i) bonding a sacrificial template of the vascularized layer to the protective layer, (ii) bonding the PMC to the sacrificial template on the protective layer, and (iii) removing the sacrificial template to form the vascularized layer integrated between the PMC and the protective layer.

9. The system of claim 8, where the sacrificial template comprises polylactic acid (PLA)/tin (II) oxalate (SnOx).

10. The system of claim 1, where the protective layer comprises a metal, alloy, polymer, traditional ceramic, advanced ceramic, or a combination thereof.

11. The system of claim 10, where the protective layer comprises titanium (Ti), aluminum (Al), stainless steel, alumina ($Al_2O_3$), titania ($TiO_2$), zirconia ($ZrO_2$), or a combination thereof.

12. The system of claim 10, which is formed by (i) filling the pores of the protective layer with a pore filler, (ii) bonding a sacrificial template of the vascularized layer to the protective layer, (iii) bonding the substrate to the sacrificial template on the protective layer, (iv) removing the pore filler, and (v) removing the sacrificial template to form the vascularized layer integrated between the substrate and the protective layer.

13. The system of claim 12, where the pore filler comprises an alcohol.

14. The system of claim 13, where the pore filler comprises isomalt.

15. The system of claim 1, where the vascularized layer is in direct contact with both the protective layer and the substrate.

16. The system of claim 15, wherein the vascularized layer:
(i) comprises a top surface and a bottom surface, the top surface being in direct contact with the protective layer and the bottom surface being in direct contact with the substrate;
(ii) is in direct contact with the fluid-containing reservoir; and
(iii) contains a portion of the fluid from the reservoir.

17. A method of autonomically cooling a material exposed to a heat source, comprising:
A. providing the heat source;
B. providing a fluid-containing reservoir connected to the material; and
C. filling the material with the fluid from the reservoir;
where, the fluid comprises a cooling liquid; and
the material comprises:
(a) a porous thermal protective layer;
(b) a structural or non-structural substrate:
(i) the structural substrate comprising a metal, ceramic, polymer matrix composite (PMC), or a combination thereof; and
(ii) the non-structural substrate comprising a non-natural elastomer; and
(c) a vascularized layer integrated between the protective layer and the substrate, such that the vascularized layer is in direct contact with the protective layer; and
where the system autonomically cools the material upon an application of sufficient heat from the heat source to the material, whereby the vascularized layer disperses the cooling liquid throughout enough of the protective layer to produce a pressure gradient between the reservoir and the pores of the protective layer, the cooling liquid in the protective layer evaporates to remove the applied heat, and the cooling liquid lost by the evaporation is replaced via capillary pressure drawing fluid from the reservoir to the vascularized layer.

18. The method of claim 17, where the fluid comprises water.

19. An autonomic cooling system comprising a fluid-containing reservoir connected to a material containing the fluid,
the fluid comprising a cooling liquid; and
the material comprising:
(a) a porous thermal protective layer;
(b) a structural or non-structural substrate:
(i) the structural substrate comprising a metal, ceramic, polymer matrix composite (PMC), or a combination thereof; and
(ii) the non-structural substrate comprising a non-natural elastomer; and
(c) a vascularized layer integrated between the protective layer and the substrate, such that the vascularized layer is in direct contact with the protective layer, the vascularized layer comprising channels in direct contact with the pores of the protective layer;

where the system autonomically cools the material upon an application of sufficient heat from a heat source to the material, whereby the vascularized layer disperses the fluid cooling liquid throughout enough of the protective layer to produce a pressure gradient between the reservoir and the pores of the protective layer, the cooling liquid in the protective layer evaporates to remove the applied heat, and the cooling liquid lost by the evaporation is replaced via capillary pressure drawing fluid from the reservoir to the vascularized layer.

20. The system of claim 19, wherein the substrate comprises the PMC.

* * * * *